US010756875B2

(12) United States Patent
Lindqvist et al.

(10) Patent No.: US 10,756,875 B2
(45) Date of Patent: Aug. 25, 2020

(54) METHODS, BASE UNITS AND REMOTE UNITS OF BASE STATION SYSTEMS OF A WIRELESS COMMUNICATION NETWORK

(71) Applicant: Telefonaktiebolaget LM Ericsson (publ), Stockholm (SE)

(72) Inventors: Fredrik Lindqvist, Järfälla (SE); Per-Erik Eriksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 118 days.

(21) Appl. No.: 16/086,900

(22) PCT Filed: Mar. 23, 2016

(86) PCT No.: PCT/SE2016/050240
§ 371 (c)(1),
(2) Date: Sep. 20, 2018

(87) PCT Pub. No.: WO2017/164782
PCT Pub. Date: Sep. 28, 2017

(65) Prior Publication Data
US 2020/0028639 A1 Jan. 23, 2020

(51) Int. Cl.
*H04L 5/00* (2006.01)
*H04L 1/00* (2006.01)
(Continued)

(52) U.S. Cl.
CPC ............ *H04L 5/006* (2013.01); *H04L 1/0003* (2013.01); *H04L 1/0009* (2013.01);
(Continued)

(58) Field of Classification Search
CPC ...... H04L 5/006; H04L 5/0046; H04L 5/0007; H04L 1/0026; H04L 1/0009;
(Continued)

(56) References Cited

U.S. PATENT DOCUMENTS 6,285,876 B1 * 9/2001 Zhong ............... H04B 3/46
370/250
9,107,203 B2 * 8/2015 Spagnolini ........... H04L 5/14
(Continued)

OTHER PUBLICATIONS

International Search Report and Written Opinion of the International Searching Authority, PCT/SE2016/050240, dated Nov. 28, 2016, 12 pages.
(Continued)

*Primary Examiner* — Afshawn M Towfighi
(74) *Attorney, Agent, or Firm* — Sage Patent Group

(57) ABSTRACT

A method is disclosed performed by a base unit, of a base station system of a wireless communication network. The base station system further comprises a remote unit connected via a wired transmission line to the base unit, the remote unit being arranged for transmitting signals wirelessly to a wireless communication device. The method comprises modulating received Media Access Control, MAC, data packets onto a plurality of sub-frequency bands of a frequency band of the transmission line, and transmitting, to the remote unit, the modulated MAC data packets over the transmission line. Further, a corresponding method performed by a remote unit is disclosed.

28 Claims, 15 Drawing Sheets

(51) Int. Cl.
*H04W 28/22* (2009.01)
*H04W 88/08* (2009.01)

(52) U.S. Cl.
CPC .......... *H04L 1/0026* (2013.01); *H04L 5/0007* (2013.01); *H04L 5/0046* (2013.01); *H04W 28/22* (2013.01); *H04W 88/085* (2013.01)

(58) Field of Classification Search
CPC . H04L 1/0003; H04L 27/2601; H04L 1/0023; H04W 88/085; H04W 28/22
See application file for complete search history.

(56) References Cited

U.S. PATENT DOCUMENTS

| | | | | |
|---|---|---|---|---|
| 2006/0133273 | A1* | 6/2006 | Julian | H04L 1/1671 370/230 |
| 2013/0072192 | A1* | 3/2013 | Xu | H04W 16/02 455/436 |
| 2013/0183989 | A1* | 7/2013 | Hasegawa | H04W 72/04 455/450 |
| 2018/0351601 | A1* | 12/2018 | Spagnolini | H04B 3/02 |

OTHER PUBLICATIONS

Mauder et al. "Towards a Flexible Functional Split for Cloud-RAN Networks", 2014 European Conference on Networks and Communications (EUCNC), IEEE, Jun. 23, 2014, 5 pages.

Small Cell Forum (Clare Somerville), Small Cell virtualization functional splits and use cases (Document 159.07.02), Release 70, Jan. 31, 2016, Retrieved from the Internet: URL:http://scf.io/en/download.php?doc=159 [retrieved on Nov. 16, 2016], 63 pages.

Homeplug Powerline Alliance, Inc., "HomePlug AV White Paper", Aug. 18, 2005, Retrieved from the Internet: URL:http://www.solwise.co.uk/downloads/fil es/hpav-white-paper 050818.pdf [retrieved on Nov. 16, 2016], 11 pages.

Gambini et al. "Wireless over Cable for Femtocell Systems," IEEE Communications Magazine, May 2013, vol. 51, No. 5, pp. 178-185.

* cited by examiner

METHODS, BASE UNITS AND REMOTE UNITS OF BASE STATION SYSTEMS OF A WIRELESS COMMUNICATION NETWORK

TECHNICAL FIELD

The present disclosure relates generally to a methods, base units and remote units of base station systems of wireless communication systems, wherein the base unit and the remote unit is connected via a wired transmission line.

BACKGROUND

There is an ever-increasing demand for bandwidth in wireless communication networks. To meet this demand a candidate suggestion is to mass-deploy small cells in the networks. By employing coordination among regular cell, i.e. macro cells, and small cells, operators can provide good coverage and high quality mobile broadband experience.

A recent enabler in this field is a so called Radio Dot System, RDS, which is shown in FIG. 1. The RDS enables operators to utilize Local Area network, LAN, cables like CAT5/6/7 for indoor radio deployments. The RDS is a kind of distributed base station system where functionality of a base station is distributed between two or more units, a remote unit that is responsible for wireless transmission of data to UEs and one or more units, here called base units that is/are responsible for e.g. baseband processing and for providing a processed signal to the remote unit. The RDS improves over other distributed base station systems such as distributed antenna systems, DAS, by providing streamlined installation system procedures, low cost and energy efficiency. An RDS system may comprise a baseband unit, BBU 30, (alternatively called a digital unit) where the modulation and coding is done so that the complex base band signal is represented by I-Q samples that are digitized and transmitted to an Intermediate Radio unit, IRU 70 (alternatively called a remote radio unit or indoor radio unit), in downlink direction, DL. The IRU 70 is arranged to up-convert the IQ samples to an intermediary frequency, IF, suitable for transmission over a wired transmission line 75, 80 such as copper wire e.g CAT5/CAT6, to one or more active antenna elements, AAE, 90, 95 connected to the respective transmission line 75, 80. The AAEs 90, 95 are arranged to further up-convert the IF-signal received from the IRU to a desired radio frequency and further transmitted wirelessly to a user equipments UE 40. The AAE is sometimes also referred as a Radio Dot, as such design enables the AAE to be designed very small. The interface between the IRU and the AAE is usually referred to as analog fronthaul. The uplink and downlink bands are separated by filters and frequency division duplex, FDD, is utilized over the transmission line 75, 80. In the uplink direction, an RF-signal received by the AAE 90, 95 from the UE 40, is down-converted by the AAE to IF, which IF-signal is transmitted to the IRU 70 over the transmission line. In the IRU, the IF-signal is down-converted to a complex base band signal and after digitization fed downwards to the BBU 30 for demodulation and decoding.

FIG. 2 describes basic blocks of the AAE 90, 95. A downlink signal received at a hybrid, Hb, from the IRU over the cable 75 is equalized at an equalizer, EQ, bandpass filtered at a first filter, Filt1, up-converted at a converter 120 to the RF frequency by mixing with a local oscillator signal, LO-DL, filtered again in a second filter, Filt2, amplified in an amplifier G, and directed to a diplexer, Di, for further transmission wirelessly via an antenna 130. In the uplink direction, an RF signal received by the antenna 130 is amplified in a low noise amplifier, LNA, filtered by a third filter, Filt3, down-converted at a converter 125 to an IF suitable for the transmission line 75 by mixing with a local oscillator signal, LO-UL, filtered in a fourth filter, Filt4, and amplified by the line driver, LD, and then being routed to the hybrid and transmitted out on the transmission line 75. Control channel information may be received and sent over the transmission line 75 through a splitter filter, Filt5, connected to a control block, comprising a control channel unit, CTR-Ch, an automatic gain control unit, AGC, and an IF Pilot unit. The AGC sends to the IRU information about the AGC changes of the uplink signal level. The pilot used for local oscillators is also extracted with splitter filters from the cable before the hybrid.

The future evolution of the RDS is planned for being equipped with digital communication that could carry a Long Term Evolution, LTE, signal over the transmission line (fronthaul) 75, 80 where already existing twisted-pair cable fronthauls are of particular interest for indoor deployment, e.g. in office buildings.

The currently deployed 4G radio systems, i.e. LTE, are designed for non-stationary fading radio channels with relatively low signal-to-interference-plus-noise-ratio, SINR. This is in contrast to the typical fronthaul channels that provide fairly stationary characteristics over time and have relatively high SINR. Furthermore, for a wired transmission line such as a twisted-pair copper cable, there is typically also a large difference in SINR over the employed frequency range which slowly changes somewhat with time. Regarding the frequency dependency, the lower (in frequency) subcarriers that have higher SINR, i.e. better transmission characteristics than the higher subcarriers, may support, for example, 10-15 bits/subcarrier while the higher subcarriers may only support e.g. 1-2 bits/subcarrier. These characteristics of the twisted-pair cable are advantageously exploited in several standardized digital subscriber line, xDSL, technologies, e.g., ADSL/ADSL2+, VDSL, and g.fast, where the power, modulation and coding schemes, MCS, are optimized per subcarrier, i.e., frequency dependent. The latter is in contrast to LTE where only one MCS is employed per transport block since frequency-dependent MCS would imply too large control overhead due to the non-stationary nature of the radio channels. Today LTE is also restricted to 256 Quadrature Amplitude Modulation, QAM, i.e., 8 bits/subcarrier.

The capacity of prior-art analog RDS systems is essentially bandwidth and modulation limited. That is, the frequency response for a given transmission line length is strongly attenuated with increasing frequency, which for the FDD fronthaul system with the DL band located above the UL band means the DL bandwidth becomes limited by the attenuation, assuming a fixed noise level. Furthermore, the carried analog-modulated LTE signals are at best modulated with 256 QAM as being the highest modulation order supported by LTE PHY layer even though the copper fronthaul channel typically supports much higher modulation order, i.e. has a higher transmission capacity. As is exemplified later on by simulation results where the invention is compared to prior art, the fronthaul capacity could be enhanced by e.g. three times that offered by prior art systems.

When the fronthaul medium has a larger capacity than the radio signals transmitted within a cell, more cells could potentially be multiplexed on the same fronthaul. This would be of interest for an operator since it utilizes the fronthaul more efficiently and hence can save cost of deployment and maintenance, as well as simplifying the system architecture. Prior art analog RDS cannot efficiently exploit a potential excessive capacity. Moreover, in a multi-operator or multi-service scenario, the cell, and hence the backhaul and Radio Dots, could be shared by more than one operator/service. The prior art RDS does not efficiently support this.

Efficient use of the fronthaul channels requires that the transmitted signals are properly encoded and modulated for the underlying fronthaul medium. However, for a fronthaul deployment, a fixed MCS over the whole allocated bandwidth can be very inefficient since the LTE radio signals are then not properly encoded and modulated for the underlying fronthaul channel, such as a twisted-pair cable. FIG. 3 shows the SNR for a CAT5e 200 m cable indicating the useful area and the calculated capacity for the prior art solution with QAM-256. For the prior art analog solution 3GPP Error Vector Magnitude, EVM, requirements have to be fulfilled on the cable which for QAM-256 is 3.5% corresponding almost to an SNR of 30 dB, which means that useful capacity will be wasted. As shown, a bitrate of 200 Mbit/s is possible to achieve with the highest modulation QAM 256, both in uplink and downlink.

Thus, in summary, prior art RDS suffers from underutilized fronthaul capacity that cannot be efficiently exploited since the FDD-based system is inherently bandwidth and modulation-size limited.

SUMMARY

It is an object of the invention to address at least some of the problems and issues outlined above. It is an object of at least some embodiments of the present invention to efficiently utilize transmission capacity over a wired transmission line connecting a remote unit and a base unit in a distributed base station system. It is possible to achieve these objects and others by using a method and an apparatus as defined in the attached independent claims.

According to one aspect, a method is provided performed by a base unit of a base station system of a wireless communication network. The base station system further comprises a remote unit connected via a wired transmission line to the base unit. The remote unit is arranged for transmitting signals wirelessly to a wireless communication device. The method comprises modulating received MAC data packets onto a plurality of sub-frequency bands of a frequency band of the transmission line, and transmitting to the remote unit, the modulated MAC data packets over the transmission line.

According to another aspect, a method is provided performed by a remote unit of a base station system of a wireless communication network. The base station system further comprises a base unit connected via a wired transmission line to the remote unit. The remote unit is arranged for transmitting signals wirelessly to wireless communication devices. The method comprises receiving modulated MAC data packets over the transmission line from the base unit, the MAC data packets being modulated onto a plurality of sub-frequency bands of a frequency band of the transmission line, demodulating the received MAC data packets, and transmitting wirelessly to a wireless device the demodulated MAC data packets as radio frequency signals.

According to another aspect, a base unit is provided, operable in a base station system of a wireless communication network. The base station system further comprises a remote unit connected via a wired transmission line to the base unit. The remote unit is arranged for transmitting signals received from the base unit wirelessly to wireless communication devices. The base unit comprises a processor and a memory. The memory contains instructions executable by said processor, whereby the base unit is operative for modulating received Media Access Control, MAC, data packets onto a plurality of sub-frequency bands of a frequency band of the transmission line, and transmitting, to the remote unit, the modulated MAC data packets over the transmission line.

According to another aspect, a remote unit is provided operable in a base station system of a wireless communication network. The base station system further comprises a base unit connected via a wired transmission line to the remote unit. The remote unit is arranged for transmitting signals wirelessly to wireless communication devices. The remote unit comprises a processor and a memory. The memory contains instructions executable by said processor, whereby the remote unit is operative for receiving modulated MAC data packets over the transmission line from the base unit, the MAC data packets being modulated onto a plurality of sub-frequency bands of a frequency band of the transmission line, demodulating the received MAC data packets, and transmitting wirelessly to a wireless device the demodulated MAC data packets as radio frequency signals.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enhance transmission of wireless communication network signals so that the signals are efficiently transmitted over a wired transmission line between a base unit and a remote unit of a base station system. The wireless communication network signals may be LTE signals or any evolution of LTE signals such as enhanced LTE or 5G. This is achieved according to an embodiment by splitting the wireless network architecture for handling LTE signals so that it is possible to send MAC data packets over the wired transmission line. In other words, the wireless network architecture is split between the base unit and the remote unit so that the physical layer architecture is located in the remote unit and the MAC layer and relevant higher layer architectures are located in the base unit. By then modulating and sending MAC data packets over the wired transmission line instead of as in prior art, analogue signals, efficient digital communication techniques are used over the wired transmission line which results in better utilization of the transmission capacity of the transmission line, i.e. higher throughput.

Figure 4:
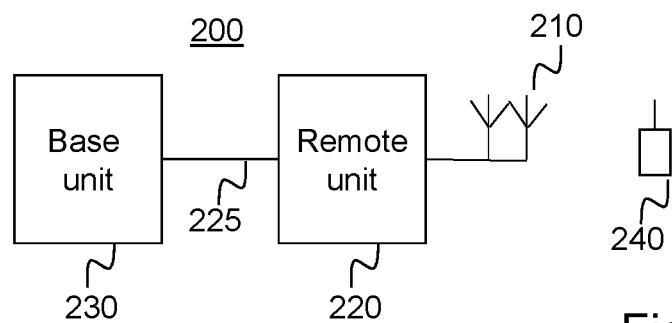
FIG. 4 is a schematic block diagram of a base station system in which the present invention may be implemented.

FIG. 4 shows a base station system 200 arranged for communication in a wireless communication network. The base station system can be seen as a base station of a wireless network, which base station has its functionality distributed between two or more nodes. The wireless communication network may be an LTE-based network or any of its predecessors or evolutions. The base station system 200 comprises a base unit 230 and a remote unit 220. The base unit 230 is connected to the remote unit 220 via a wired transmission line 225. The base unit is arranged to be connected to other nodes of the wireless communication network, such as to a mobility management entity, MME, of an LTE network, so as to send and receive signals from/to other parts of the network. For downlink communication, the base unit is arranged to receive signals from the network destined to a wireless communication device 240, in the following called a user equipment, UE, 240 that has a wireless connection to the base station system. The base unit is arranged for baseband processing of the received signal and for sending the baseband processed signal over the wired transmission line 225 to the remote unit. The base unit may also have functionality for up-converting the baseband processed signal to an intermediate frequency, IF, suitable for transmission over the transmission line 225 and then for sending the baseband processed signal at the IF to the remote unit 220. The base unit may be split into a BBU and an IRU as in the previously mentioned RDS system. The remote unit 220 is arranged for receiving the signal from the base unit 230 and for up-converting the received signal to radio frequency, RF, and for wireless transmission of the up-converted RF-signal to the UE 240 via its antenna(s) 210. In a similar way for uplink, the remote unit is arranged for receiving wireless radio signals from the UE 240, for down-converting the wireless signals from RF to baseband or to IF and for transmitting the down-converted signal to the base unit 230. The base unit 230 is arranged for baseband processing of the signal received from the remote unit 220, and, if the received signal was an IF-signal, for down-converting the signal to baseband before baseband processing the signal.

Figure 5:
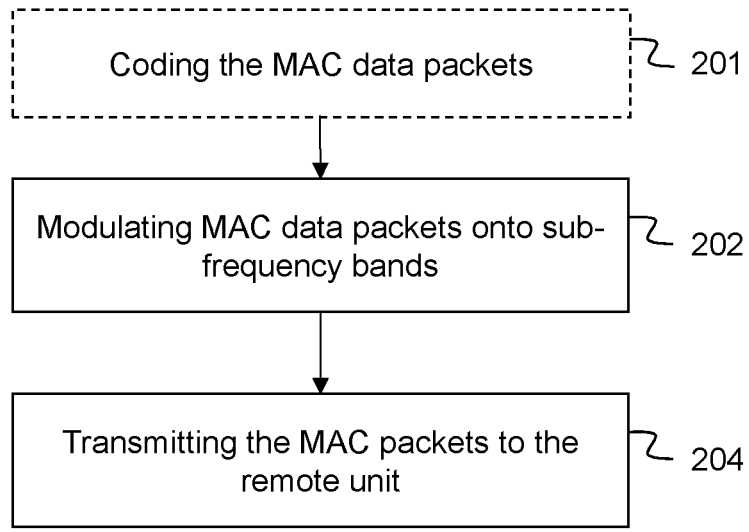
FIGS. 5-7 are flow charts illustrating methods performed by a base unit of a base station system according to possible embodiments.

FIG. 5, in conjunction with FIG. 4, describes a method performed by a base unit 230, of a base station system 200 of a wireless communication network. The base station system comprises a remote unit 220 connected via a wired transmission line 225 to the base unit 230. The remote unit 220 is arranged for transmitting signals wirelessly to a wireless communication device 240. The method comprises modulating 202 received Media Access Control, MAC, data packets onto a plurality of sub-frequency bands of a frequency band of the transmission line, and transmitting 204, to the remote unit, the modulated MAC data packets over the transmission line. The MAC data packets may comprise LTE information. By splitting architecture for handling LTE communication, or other similar type of communication such as 5G, between the base unit and the remote unit, the remote unit is able to receive MAC data packets and demodulate them, before encoding and modulating according to the LTE specification (or future 5G), and then send them further in RF to the wireless devices. By sending modulated MAC data packets over the wired transmission line between the base unit and the remote unit, efficient digital data communication techniques can be used over the transmission line which makes it possible to send data more efficiently over the transmission line compared with today's analogue techniques used over such a transmission line.

According to another embodiment, a first group of the MAC data packets belong to a first data stream and a second group of the MAC data packets belong to a second data stream. Further, the MAC data packets of the first data stream and the MAC data packets of the second data stream are transmitted 204 to the remote unit time interlaced and/or frequency interlaced over the transmission line. Data bits of the first data stream may be time and/or frequency interlaced with data bits of the second data stream. The MAC data packets of the first data stream and the MAC data packets of the second data stream may be frequency interlaced over a transmission frequency band of the transmission line. According to an embodiment, The MAC data packets of the first data stream and the MAC data packets of the second data stream are interlaced in time according to the differences in latency requirements, i.e., delay requirements, between the first and the second MAC data stream. In another embodiment, the interlacing of MAC data streams is performed both in frequency and in time to achieve further enhanced efficiency and increased flexibility.

By interlacing the packets of the first data stream with the packets of the second data stream over the transmission frequency band, the transmission of many data streams over the transmission line is more robust to e.g. frequency-related impairments of the transmission line than a solution where the data streams are transmitted concentrated to one sub-frequency band. To frequency interlace the MAC data packets of the first data stream with the MAC data packets of the second data stream signifies sending a part of the first group of packets on a first frequency sub-band followed by a part of the second group of packets on a second frequency sub-band higher in frequency than the first frequency sub-band and another part of the first group of packets on a third sub-band higher than the second sub-band and another part of the second group of packets on a fourth sub-band higher than the third sub-band etc. A data stream may be a group of packets that are destined to a UE wirelessly connected to the remote unit, or a group of packets for one or more UEs that belong to the same cell. Different operators may share the same base station system so that the same remote unit supplies radio coverage to two or more different cells, e.g. via different antennas, i.e. then different data streams may represent different cells. Different data streams may represent different cells also when there is only one operator.

Figure 6:
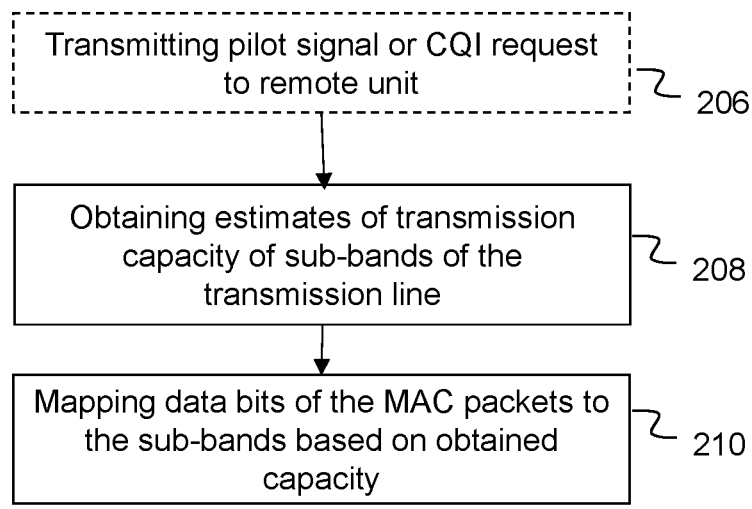

According to another embodiment, which is illustrated in FIG. 6, the method further comprises obtaining 208 estimates of maximum transmission capacity of the sub-bands of the transmission line, and allocating 210 data bits of the MAC data packets to the plurality of sub-bands based on the obtained estimates of maximum transmission capacity of the sub-bands. Further, the data bits of the MAC data packets are transmitted 204 in the plurality of sub-bands in accordance with the allocation. According to an embodiment, the MAC data packets are allocated to the plurality of sub-bands based on the maximum transmission capacity of the individual sub-bands for a given error rate requirement. The error rate requirement may be different for different MAC data streams.

The MAC data packets each comprises data bits. After the data bits have been allocated to the different sub-bands depending on their transmission capacity, the data bits may be IFFT transformed into analogue domain, e.g. DMT modulated onto the sub-bands, and sent over the transmission line to the remote unit. The data bits are preferably also encoded with a forward error correcting code (FEC) and also scrambled before they are IFFT transformed. Data bits may cover user data bits and/or control bits. According to an embodiment, it is the data bits of the MAC data packets as well as necessary overhead that is mapped to the plurality of sub-bands based on the obtained maximum transmission capacity. By allocating the data bits onto sub-bands depending on the capacity of the individual sub-bands, the transmission capacity of the transmission line is more efficiently used than if a same capacity is assumed for all sub-bands. Also, there is less risk that data are lost because too much data is sent on a sub-band that has low maximum transmission capacity. The method(s) described in FIG. 6 is performed at least before step 204 of FIG. 5 but possible also before step 201 and 202.

According to an embodiment, the estimates of maximum transmission capacity of the sub-bands are obtained 208 from information received from the remote unit. Hereby, the base unit can receive an accurate estimation of the maximum transmission capacity of the sub-bands of the transmission line.

According to a variant of this embodiment, the method further comprises transmitting 206, to the remote unit, a signal on the sub-bands, and wherein the information received from the remote unit comprises information of signal to noise ratio measured on the transmitted signal. The signal transmitted 206 to the remote unit may be a measuring signal such as a pilot signal or pilot sequence. The signal/sequence may be received on some or all of the sub-bands. With signal to noise ratio is meant both Signal to noise ratio, SNR, and signal to noise and interference ratio, SINR. The information of signal to noise ratio may be per sub-band. From the transmitted (pilot) signal, the remote unit can measure and estimate maximum transmission capacity of the sub-bands.

According to another variant of this embodiment, the method further comprises transmitting 206 a Channel Quality Indicator, CQI, request to the remote unit, and wherein the information received from the remote unit of estimates of maximum transmission capacity originates from a translation of CQI values of the CQI request. Today the LTE CQI table only covers up to 8 bits, wherefore an extension of the existing LTE specification to larger number of bits could be desirable.

Figure 7:
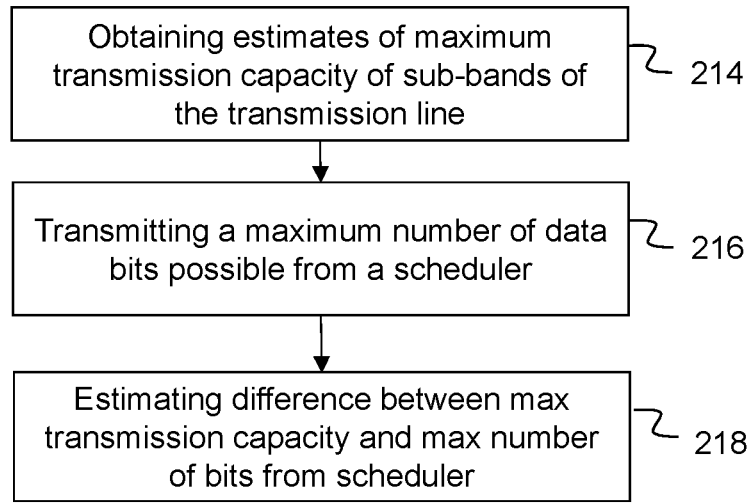

According to another embodiment illustrated in FIG. 7, the method further comprises obtaining 214 estimates of maximum transmission capacity of the sub-bands over the transmission line, obtaining 216 estimates of maximum scheduler transmission capacity, the scheduler transmission capacity corresponding to number of bits possible to transmit from a scheduler of the base unit over the transmission line, and estimating 218 a difference between the obtained maximum transmission capacity and the maximum scheduler transmission capacity.

Thereby it is possible to use the transmission resources of the transmission line in a more efficient way, when knowing about any possible difference between maximum line transmission capacity and maximum scheduler transmission capacity. The estimation may be sent e.g. to an operator management system for further analysis and/or planning of the network comprising the base station system. The estimated difference between maximum line transmission capacity and maximum scheduler transmission capacity may be used when modulating and transmitting the MAC data packets to the remote unit. The estimate of maximum scheduler transmission capacity may be obtained by setting the scheduler(s) to transmit at its/their maximum on the transmission line and measure the outcome. This can be a preferred solution especially when multiple operators share the same fronthaul system but have different MAC schedulers with possibly different restrictions. Alternatively, the estimate of maximum scheduler transmission capacity may be pre-calculated theoretically as a function of maximum transport block, TB, size e.g. in number of bits, whether 1 or 2 TB is used, i.e., selected MIMO type, number of UEs, including from several operators/cells if that is used, system bandwidth, etc. The resulting theoretically pre-calculated max scheduler transmission capacity may be pre-stored to be available when calculating the capacity margin, i.e. the difference as shown above.

According to an embodiment, based on the estimated 218 difference between maximum transmission capacity and maximum number of bits from a scheduler, the modulated MAC data packets are transmitted 204 to the remote unit over the transmission line at the plurality of sub-frequency bands except for the outermost sub-frequency bands.

Hereby it is possible when having a rather high difference between maximum transmission capacity of the transmission line and maximum number of bits from the scheduler, i.e. excessive transmission capacity, to trade off this excessive transmission capacity to a reduced spectral leakage. For this reason, the transmission of the MAC data packets are limited to the plurality of sub-frequency bands in a middle part, i.e. without using the outermost sub-frequency bands so that the UL will experience lower spectral leakage. The outermost sub-frequency bands are the sub-frequency bands that are in the lowest and highest frequency of the transmission line frequency band. This embodiment may be dedicated to frequency division duplex communication. Further, the outermost sub-frequency bands where the MAC data packets are not sent, may be the frequency band(s) closest to an uplink/downlink guard band.

According to an embodiment, a first group of the MAC data packets belong to a first data stream having a first error rate requirement and a second group of the MAC data packets belong to a second data stream having a second error rate requirement different from the first error rate requirement, further comprising allocating data bits of the MAC data packets to the plurality of sub-bands based on the first and second error rate requirement, and wherein data bits of the MAC data packets are transmitted 204 in the plurality of sub-bands in accordance with the allocation. Hereby, it is possible to allocate the bits of the different groups of MAC packets so that the different error rate requirements for the two data streams are fulfilled. According to an embodiment, there is a MAC scheduler in the base unit that schedules MAC data packets of a first data stream directed to a first UE and MAC data packets of a second data stream directed to a second UE. In case the first and the second data stream are associated with different operators, there may be separate MAC scheduler for the first and the second data stream.

In accordance with another embodiment, the first data stream may be associated with a UE associated with a first operator and the second data stream may be associated with a UE associated with a second operator. The allocation of the data bits of the MAC data packets of the first and second data stream may be based on the first and second operator, e.g. to achieve a fair treatment for data streams for different operators.

According to an embodiment, the modulation of received MAC data packets comprises multi-carrier modulation of the MAC data packets, such as discrete multi-tone modulation, DMT. Multicarrier modulated MAC data packets may be called MCMC data packets. DMT is a modulation method similar to orthogonal frequency division multiplexing, OFDM, but better suited for wired transmission lines than OFDM, which is more adapted to wireless transmission. Multicarrier modulation provides good conditions for conveying a real-valued baseband time-domain signal, such as a MAC data packet, over a wired transmission line.

According to another embodiment, as illustrated in FIG. 5, the method further comprises coding 201 the MAC data packets. Further, the transmitting 204 comprises transmitting the modulated and coded MAC data packets. The coding step 201 is normally performed before the modulation step. The coding and modulation may also be performed as a coded-modulation, i.e. a combined encoding and modulation. It can have an advantage on bandwidth constrained channels and has been used in, for example, digital subscriber line, DSL, transmissions. One such known type is Trellis-coded modulation. The coding is usually followed by a scrambling step in which data bits of the coded MAC data packets are scrambled.

Figure 8:
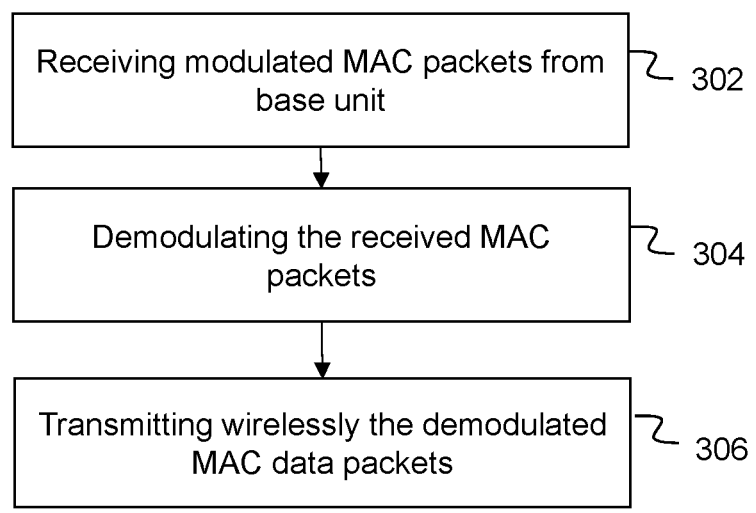
FIGS. 8-9 are flow charts illustrating methods performed by a remote unit of a base station system according to possible embodiments.

FIG. 8 in conjunction with FIG. 4 shows another aspect in which a method is provided performed by a remote unit 220 of a base station system 200 of a wireless communication network. The base station system further comprises a base unit 230 connected via a wired transmission line 225 to the remote unit 220, the remote unit being arranged for transmitting signals wirelessly to wireless communication devices 240. The method comprises receiving 302 modulated MAC data packets over the transmission line from the base unit, the MAC data packets being modulated onto a plurality of sub-frequency bands of a frequency band of the transmission line, demodulating 304 the received MAC data packets, and transmitting 306 wirelessly to a wireless device 240 the demodulated MAC data packets as radio frequency signals.

The remote unit may, after demodulation, and possible decoding and scrambling, of the packets received on the transmission line, encode and modulate bits of the packets according to the MAC scheduling decision, i.e. perform conventional LTE baseband and RF processing. This is performed so as to be able to transmit the received MAC data packets as radio frequency signals. Note that the demodulation (and possible decoding) of the bits of the MAC packets that is performed by the remote unit is for a modulation (and possible coding) performed by the base unit for the sub-bands of the transmission line and not for the RF transmission. i.e. data is modulated a first time for transmission over the transmission line and modulated a second time for transmission as RF signals wirelessly to wireless devices.

According to an embodiment, the received 302 modulated MAC data packets are also coded, and the method further comprises decoding the received MAC data packets.

According to another embodiment, a first group of the MAC data packets belong to a first data stream and a second group of the MAC data packets belong to a second data stream. Further, the MAC data packets of the first data stream and the MAC data packets of the second data stream are received 302 time and/or frequency interlaced over the transmission line.

According to another embodiment, data bits of the MAC data packets are received allocated to the plurality of sub-bands depending on maximum transmission capacity of individual of the sub-bands of the transmission line and wherein the remote unit is aware of the allocation of the data bits of the MAC data packets to the plurality of sub-bands when receiving the MAC data packets. The settings of the adaptive allocation at the scheduler, i.e. mapping of data to different sub-bands, is communicated to the remote unit from the base unit, e.g. after estimation of the maximum transmission capacities of the different sub-bands. As the communication conditions on the transmission line is fairly stationary, the maximum transmission capacities on the different sub-bands may be measured during installation and possibly improved during maintenance whereupon the settings of the adaptive mapping can be made known to the remote unit prior to normal data traffic is sent. Alternatively, a separate bit rate control channel may be used to communicate the settings. According to an embodiment, the MAC data packets are allocated to the plurality of sub-bands depending on the maximum transmission capacity of the individual sub-bands for a given error rate requirement. The error rate requirement may be different for different MAC data streams.

Figure 9:
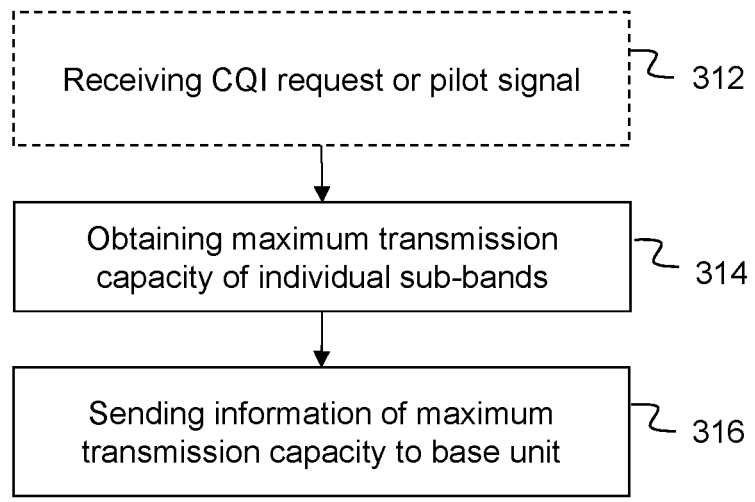

According to another embodiment as shown in FIG. 9, the method further comprises obtaining 314 the maximum transmission capacity of the individual of the sub-bands and sending 316 information on the measured maximum transmission capacity on the individual sub-bands to the base unit.

According to another embodiment, the method further comprises receiving 312 a signal from the base unit. Further, the obtaining 314 of maximum transmission capacity comprises measuring SINR on the individual sub-bands on the received signal. Further, the sending 316 of information of maximum transmission capacity comprises sending information of the measured SINR on the individual sub-bands to the base unit. The signal received from the base unit may be a pilot signal or pilot sequence.

According to another embodiment, the method further comprises receiving 312 a CQI request from the base unit. Further, the obtaining 314 of maximum transmission capacity comprises obtaining CQI values from the received CQI request, and translating the obtained CQI values to the information of maximum transmission capacity of the individual sub-bands. The CQI values may be obtained from one or more UE(s) that is/are situated close to the remote unit, or in the remote unit from a dedicated UE-mimic function.

Hereby, already existing LTE signalling can be reused for measuring transmission capacity.

According to an embodiment, a first group of the MAC data packets belong to a first data stream having a first error rate requirement and a second group of the MAC data packets belong to a second data stream having a second error rate requirement different from the first error rate requirement. Further, data bits of the received MAC data packets are allocated to the plurality of sub-bands based on the first and second error rate requirement, and data bits of the MAC data packets are received 302 in the plurality of sub-bands in accordance with the allocation.

According to another embodiment, the received modulated MAC data packets are multi-carrier modulated MAC data packets, such as DMT modulated MAC data packets.

According to another embodiment, it is proposed to split the LTE architecture of the base station which is today situated in the base unit such that architecture for handling the LTE PHY layer is located in the remote unit while architecture for handling the MAC layer and relevant higher layers are located in the base unit. Thereby, the transmission rate of LTE radio signals via a wired transmission line such as the twisted-pair copper cable, can be enhanced. In doing so, efficient digital communication techniques can be utilized for transmission on the wired transmission line. Further, the remote unit, which is cost-sensitive, does not need to implement a computational complex MAC Scheduler and higher layers, which would have been needed if also architecture for handling the MAC layer and possible higher layers would have been located at the remote unit. In addition, LTE baseband chips that already contains modulation/demodulation functions and encoding/decoding functions can be integrated in the remote unit while at the same time minimizing the bitrate requirement on the wired transmission line (also called fronthaul) compared to putting the LTE encoding/decoding functions at the base unit. As LTE architecture is moved in such a way, the base unit will send, in downlink, modulated MAC data packets over the fronthaul to the remote unit, and the remote unit will be able to receive and demodulate the received MAC data packets. Furthermore, such split of functionality enables multiple LTE operators to share the base station system without giving up their own MAC Scheduler implementations since the PHY LTE layer is implemented in the remote unit and hence takes the transport blocks from the MAC layer as input, via the fronthaul. A slight modification of the proposed split would be to put the LTE encoder/decoder in the base unit to further reduce the complexity of the remote unit, but this would increase the capacity requirement on the fronthaul, wherefore such split is deemed less favorable.

According to an embodiment, it is proposed that excessive fronthaul capacity is exploited to support multiple cells, and/or multiple operators, on the same fronthaul by instead of frequency division duplex, FDD, utilize an echo cancelled fronthaul system with shared uplink and downlink bands together with increased modulation size for the fronthaul subcarriers. More specifically, the data streams from the multiple cells/operators can be interlaced among the fronthaul subcarriers to spread out the data evenly and fairly on good/bad subcarriers within the fronthaul transmission band. This also enables differentiating multiple services/cells on the fronthaul with e.g. different error-rate requirements, for example, simultaneous fronthaul transmission of mobile broadband and critical machine type services.

According to another embodiment, for a FDD-only fronthaul system, it is proposed to adaptively allocate the LTE signal(s)/MAC data packets to subcarriers that cause less spectral leakage and hence avoid strong interference-generating subcarriers. This may be performed when there is excessive fronthaul capacity so that the excessive fronthaul capacity is traded for reduced spectral leakage interference.

Figure 1:
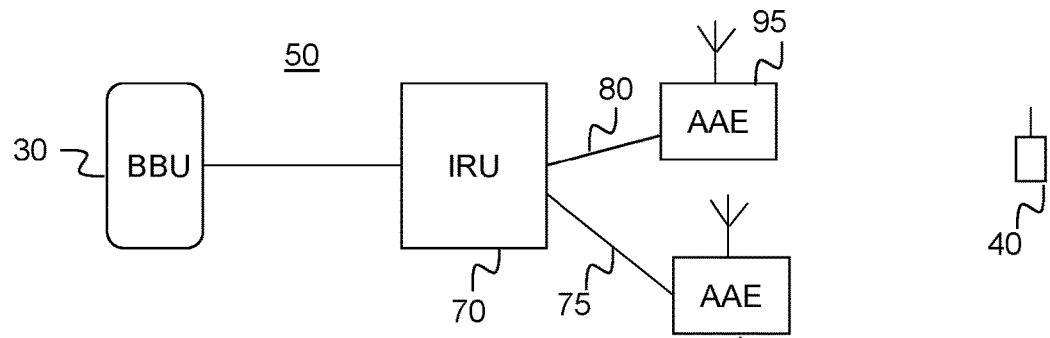
FIG. 1 is a schematic block diagram of a known radio dot system.
Figure 2:
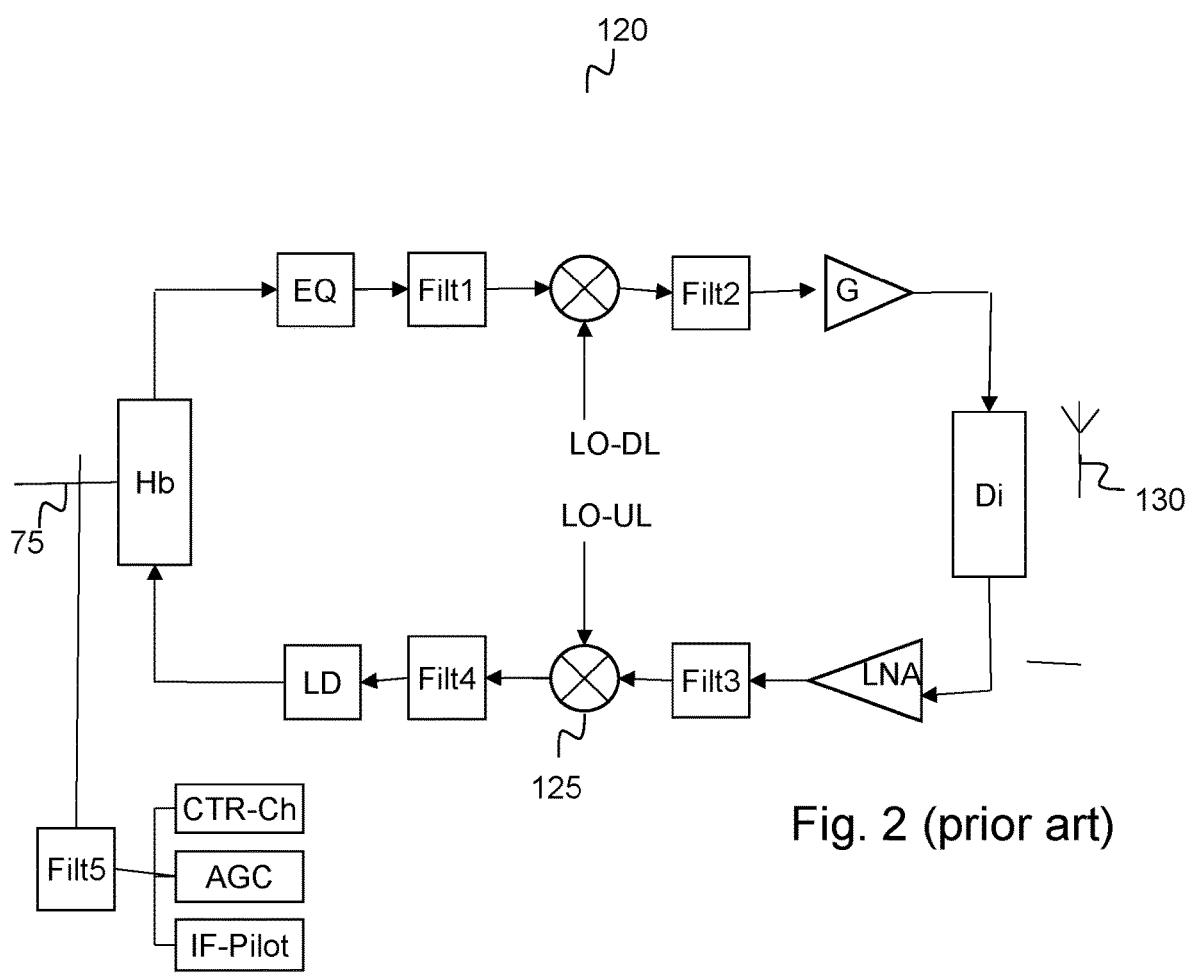
FIG. 2 is a schematic block diagram describing functional blocks of an AAE according to prior art.
Figure 3:
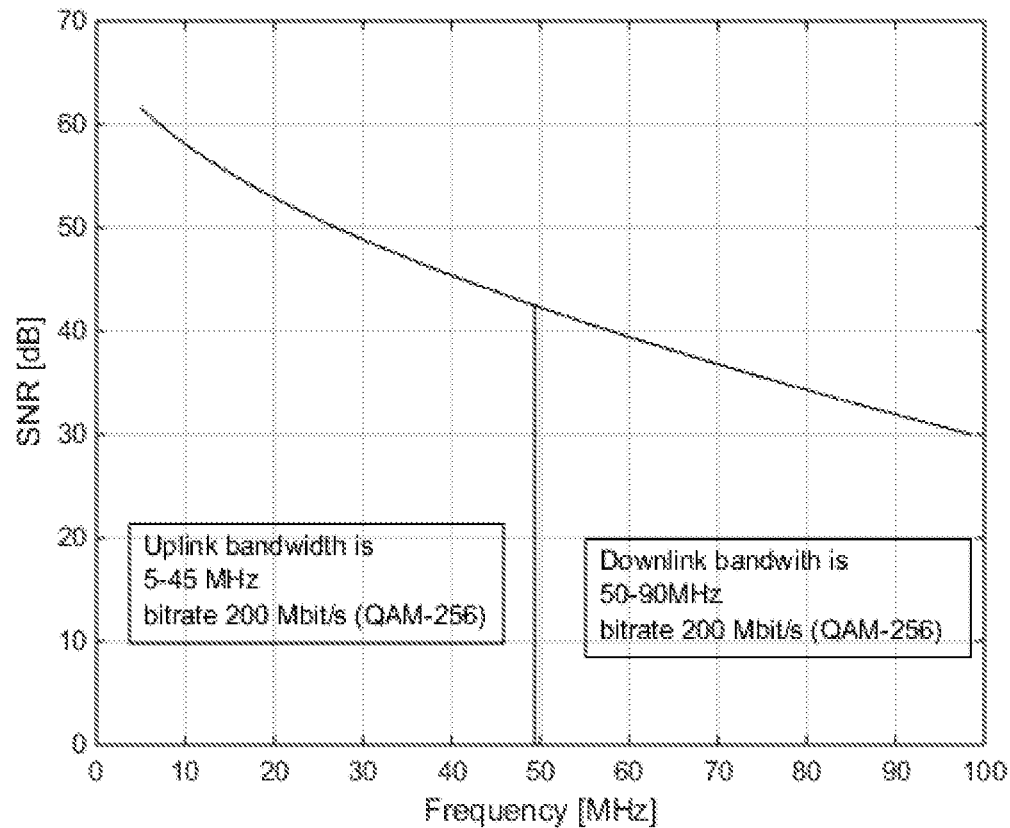
FIG. 3 is an x-y diagram showing possible bit rate over a CAT 5 cable using prior art.
Figure 10:
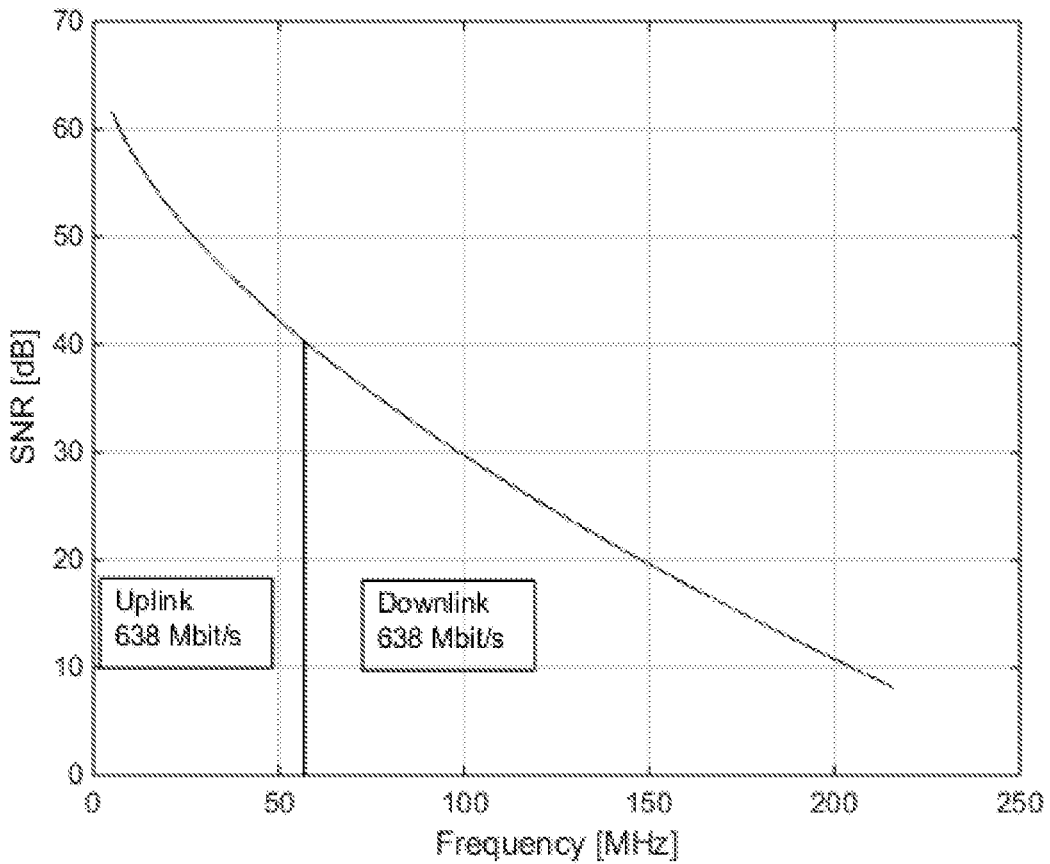
FIG. 10 is an x-y diagram showing possible bit rate over a CAT 5 cable using embodiments of the present invention.

A driving force for the upcoming of embodiments of the invention has been the knowledge that prior art base stations systems do not efficiently use the true capacity of the fronthaul of the base station system. FIG. 3 showed a bitrate achieved for prior art. In FIG. 10, a plot of the SNR for 200 m CAT5 with a calculated theoretical capacity for a FDD case is shown. As seen, a theoretical capacity of 638 Mbit/s for both uplink and downlink was achieved. A comparison with the prior art case of FIG. 3 giving a bit rate of 200 Mbit/s uplink and downlink gives that the capacity can be sufficiently larger if another solution than prior art is used.

Figure 11:
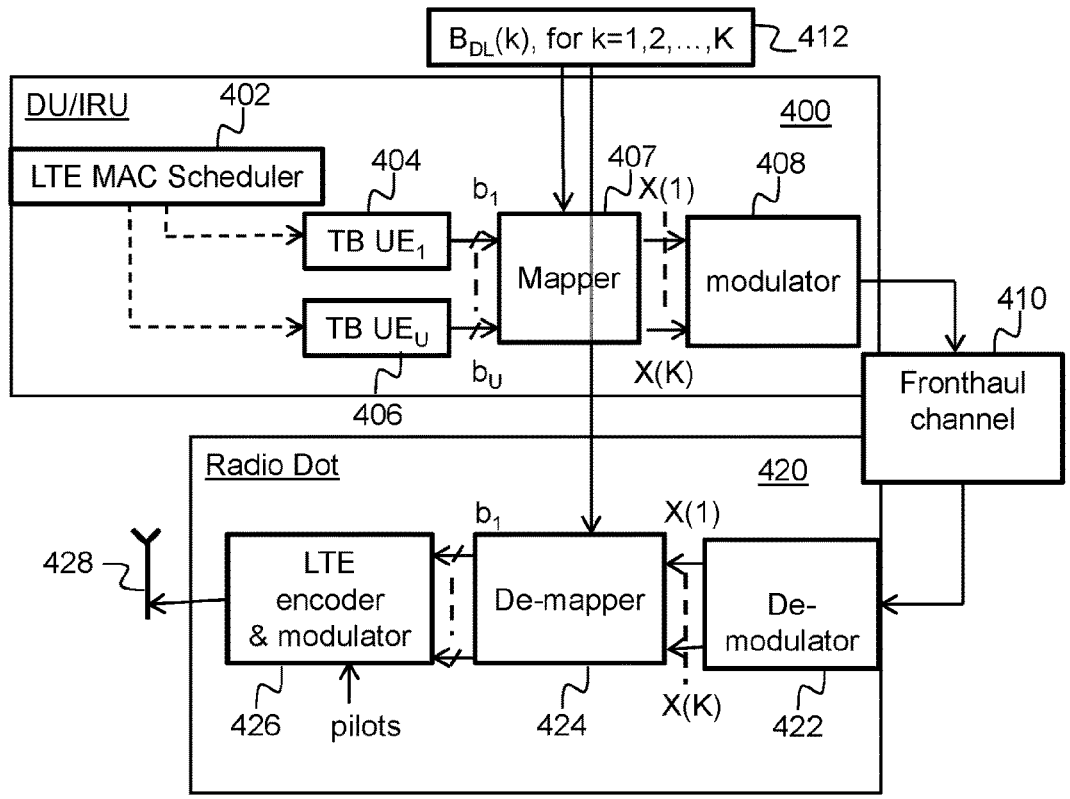
FIGS. 11-12 are schematic block diagrams of a DU/IRU and a radio dot of a RDS system according to possible embodiments.

In the following, a description is provided for a radio dot system, RDS. However, the description may as well be applicable to any other distributed base station system as described in FIG. 4. In FIG. 11 (downlink case) and FIG. 12 (uplink case), block diagrams are shown focusing on the proposed geographical split of the LTE functionality in a digital RDS. More specifically, an LTE MAC Scheduler 402 resides in the DU/IRU 400 and makes decisions on how to schedule MAC data packets of each UE $UE_1$-$UE_u$ connected to the antenna 428 of the radio dot 420, based on e.g. channel state information, CSI, quality of service requirements, and buffer sizes, to just mention some typical scheduling input variables. The scheduler outputs one or two transport blocks, TB per UE 404, 406 depending on type of spatial multiplexing, MIMO. To simplify the description, but without much loss of generality, we will assume that each UE is assigned one TB from the Scheduler. The Scheduler also decides on the number of LTE subcarriers for each user u where u=1, 2, . . . , U, as well as deciding the $MCS_u$. This type of scheduling information can be sent to the Radio Dot via an in-band, or separate, control channel with fairly low bit rate. With U number of UEs, the LTE Scheduler assigns TBs of $b_1$, $b_2$, . . . , $b_u$ number of information bits per respective UEs, per TTI. Thus, the total number of LTE information bits per TTI is $\Sigma_{u=1}^{U} b_u$ which are treated as one input bit-frame for the fronthaul communication system. It should be noted that U is the total number of scheduled UEs on the fronthaul channel which generally could cover multiple cells. The IRU of FIG. 11 further has a mapper 407 that receives data of the different UE TBs and maps or allocates bits to different sub-bands of the fronthaul channel 410, and a modulator 408 that modulates the data onto the different sub-frequencies according to the mapping before the data are sent over the fronthaul channel 410 to the radio dot 420. The radio dot 420 comprises a de-modulator 422 that demodulates received data, a de-mapper 424 de-maps the data according to the mapping and an LTE encoder and modulator 426 that encodes and modulates the data to be transmitted wirelessly into RF frequency. Further, the mapping 412, $B_{DL}$ to be used is delivered to the mapper and de-mapper so that they use the same mapping/de-mapping code. The mapping 412 may be pre-stored at the DU/IRU and the radio dot or measured at one of the DU or radio dot and communicated between the DU and the radio dot.

Figure 12:
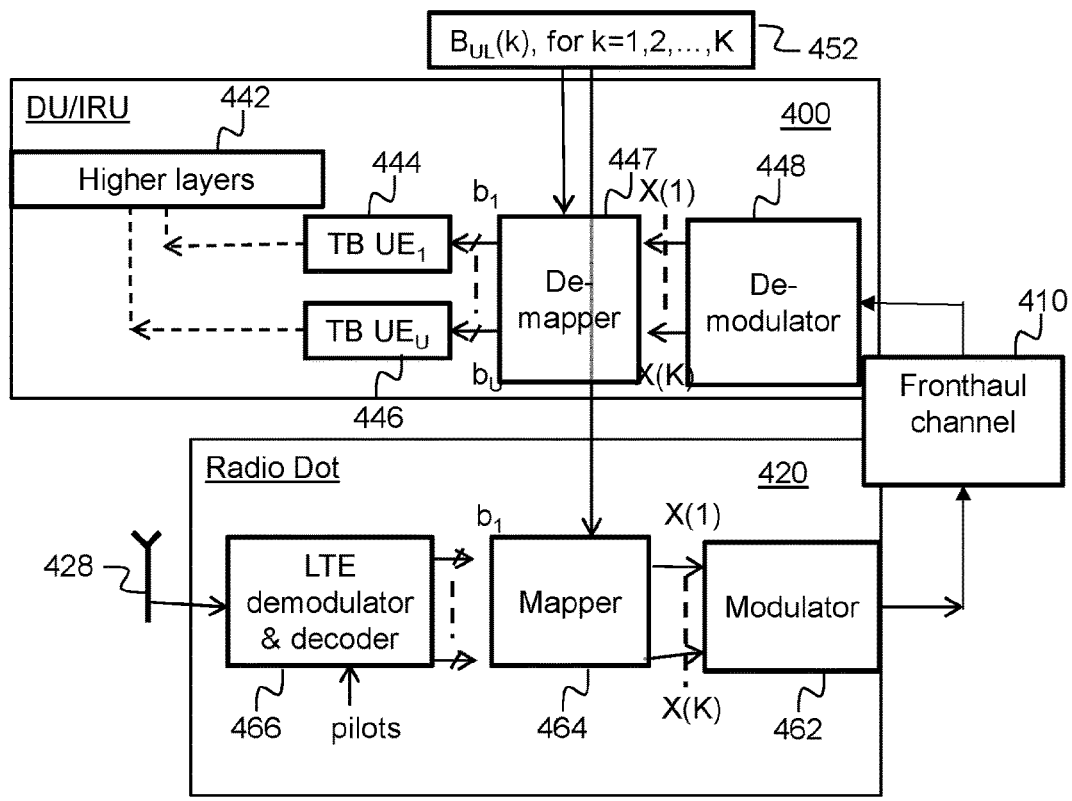

For the uplink direction, as shown in FIG. 12, the handling of signals received at the antenna 428 for different UEs are treated in a similar way as for the downlink, but the data is of course sent from the antenna 428 of the radio dot via LTE demodulator and decoder 466 that demodulates and decoded received RF frequency data, the mapper 464 that maps the bits to sub-frequencies, the modulator that modulates the bits to the different sub-frequencies and further via the fronthaul channel 410 to the IRU 400. The IRU has a demodulator 448 that receives the data from the fronthaul channel and demodulates the data, a de-mapper 447 that de-maps the data according to the pre-stored or measured uplink mapping 452, $B_{UL}$ and sorts the data into TB data streams 444, 446 that are sent for higher layer treatment to higher layers functionality 442.

Figure 13:
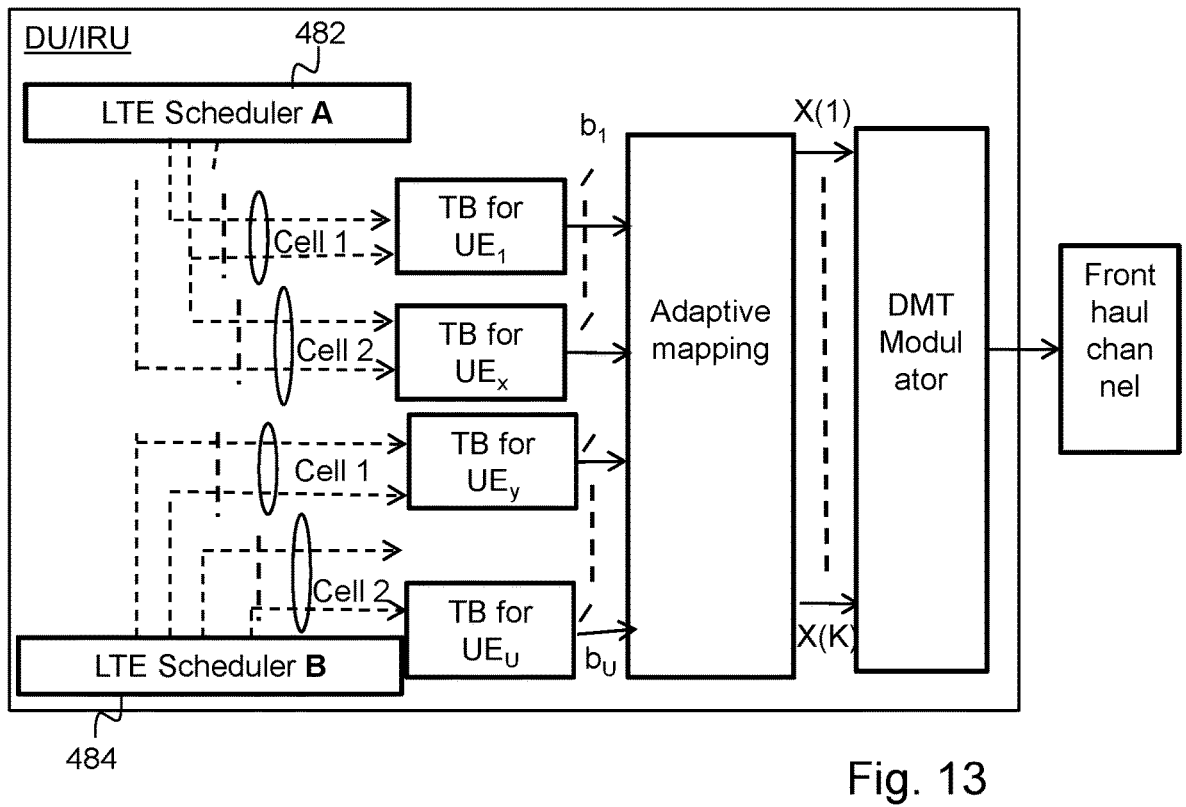
FIG. 13 is a schematic block diagram of a DU/IRU of an RDS system according to further possible embodiments.

In another embodiment, the U number of UEs of FIGS. 11 and 12 could belong to different operators and/or different cells. This generalization is illustrated in FIG. 13 by a block diagram of a DU/IRU with focus on the downlink case. However, the embodiment would function in a similar way for the uplink. Here, the DU/IRU has two different LTE MAC schedulers, A 482 and B 484, which may belong to different operators. As can be seen, the data streams of the UEs of the different schedulers are mapped and modulated onto the same fronthaul channel. It should be noted that one or both of the LTE MAC Schedulers could be located outside the DU/IRU in which the block diagram merely contains the corresponding interface function.

Figure 14A:
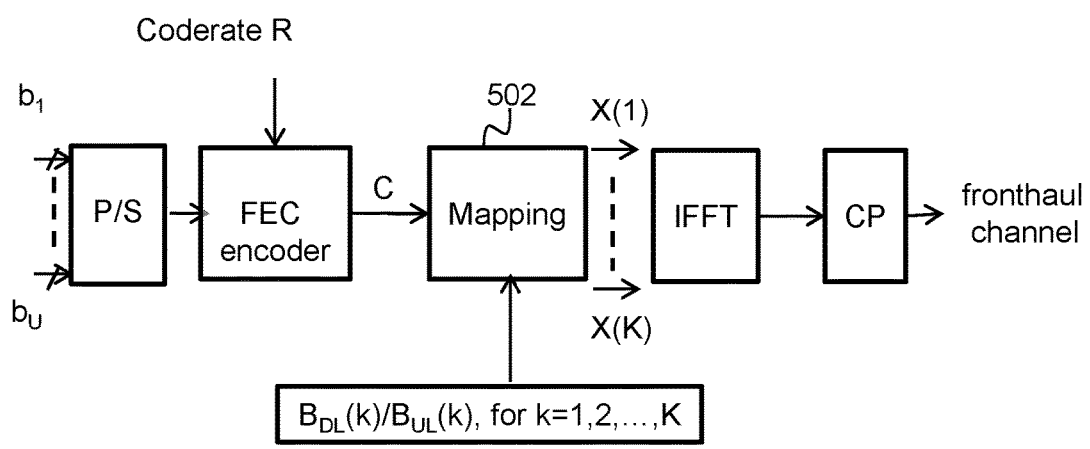
FIG. 14a is a schematic block diagram of an adaptive mapper according to possible embodiments.
Figure 14B:
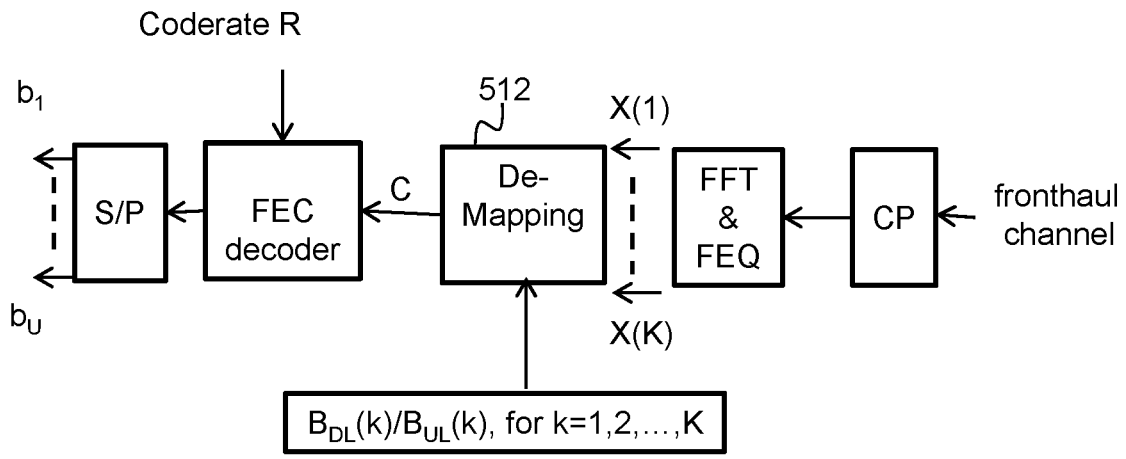
FIG. 14b is a schematic block diagram of an adaptive de-mapper according to possible embodiments.

FIG. 14a shows a more detailed block diagram of the adaptive mapper unit 407 of FIG. 11 used in the DU/IRU in downlink. FIG. 14b shows in a similar way a more detailed block diagram of the adaptive de-mapper unit 447 used in the DU/IRU in uplink. The respective mapper/de-mapper comprises adaptive constellation mapping/de-mapping 502/512, means for forward error correction, FEC, e.g., a block- or convolutional encoder/decoder, and serial-to-parallel, SIP functions, and vice versa, P/S. The mapper of FIG. 14a further comprises an inverse Fourier transform unit, IFFT, and a Cyclic prefix unit, CP. The de-mapper of FIG. 14b further comprises a fast Fourier transform, FFT, unit and a frequency domain equalizer, i.e., FEQ unit, and a cyclic prefix unit, CP. The FEC decoder is arranged for decoding and error correction. The FEC encoding of FIG. 14a adds overhead and hence increases the total number of bits to $M=(1/R)\Sigma_{u=1}^{U} b_u$, where R is the code rate of the FEC. The output bit stream of the FEC encoder is denoted C={c(1) c(2) ... c(M)}, which in turn is the input to the adaptive mapper.

Adaptive subcarrier mapping/de-mapping. The task of the adaptive mapper 407/502 of the DU/IRU in FIG. 11 and FIG. 14a, is to assign, or allocate, for each TTI, the incoming bits C={c(1)c(2) ... c(M)} to the K number of subcarriers in the fronthaul system. Based on measurements of the maximum supported bits per subcarrier on the fronthaul channels, different strategies can be employed for the mapping depending on a goal that is to be achieved. More specifically, according to one embodiment of the invention shown further down, DL/UL capacity is traded for reducing impact of spectral leakage between uplink and downlink or crosstalk interference. The de-mapper 447, 512 essentially performs the inverse operation, i.e., it maps the received bits on the K fronthaul subcarriers to the bit stream {c(1) c(2) ... c(M)} that is input to FEC decoder of the fronthaul receiver.

Figure 15A:
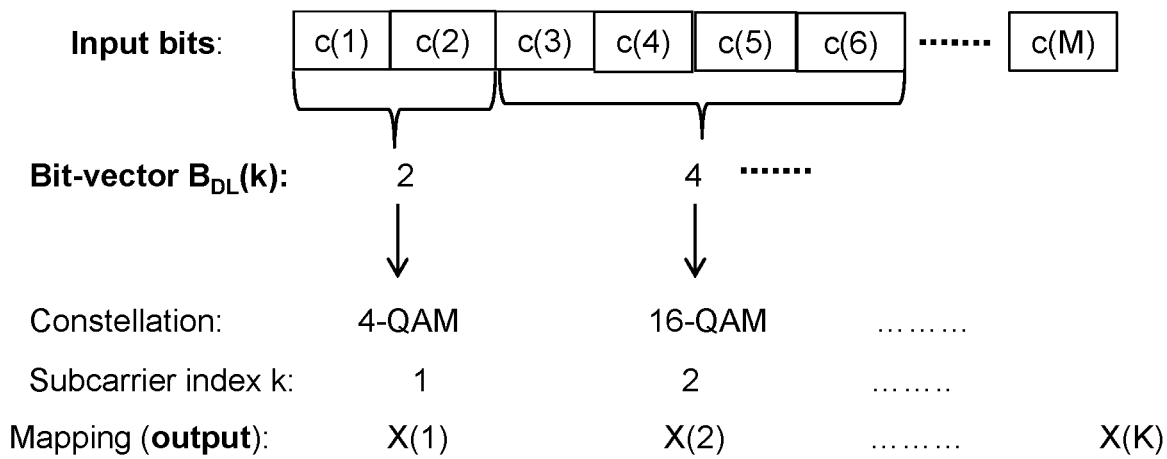
FIG. 15a is a schematic diagram explaining adaptive constellation mapping according to possible embodiments.
Figure 15B:
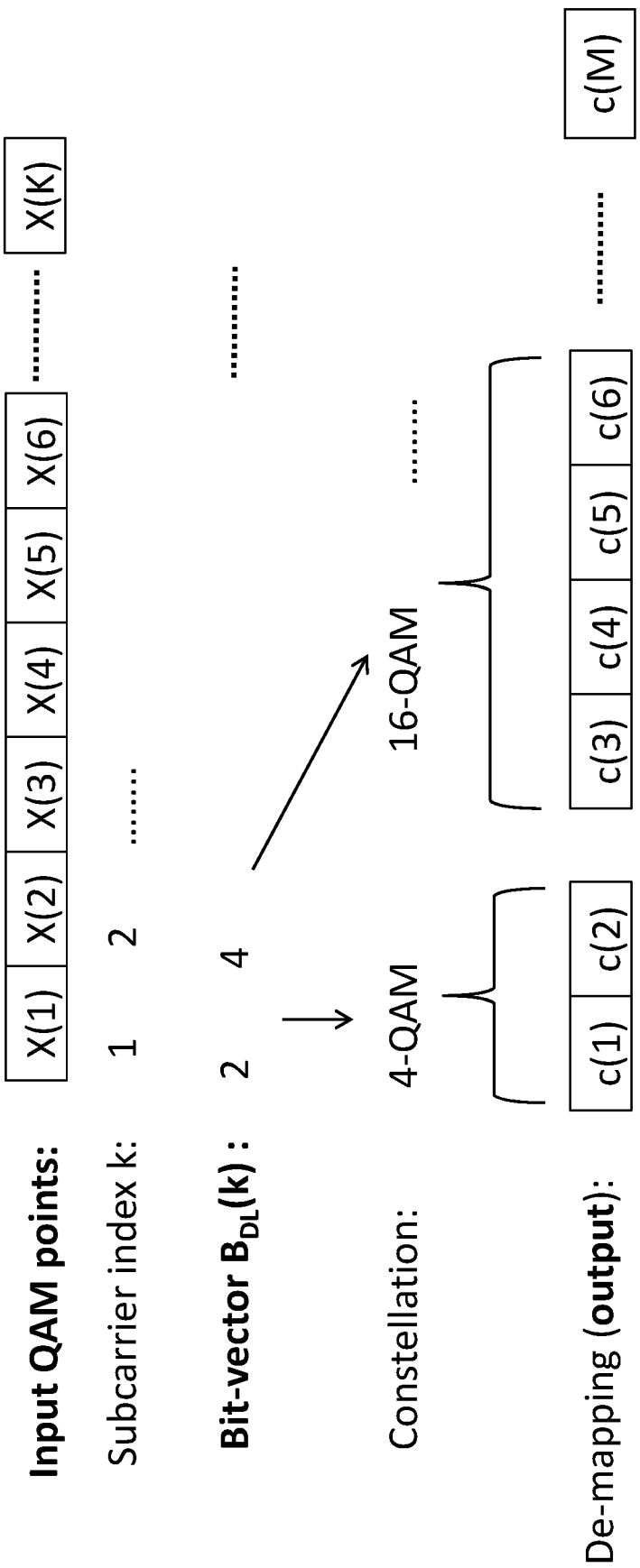
FIG. 15b is a schematic diagram explaining adaptive constellation de-mapping according to possible embodiments.

Exemplary rules how to perform the mapping/de-mapping in downlink are shown in FIGS. 15a and 15b, respectively. FIG. 15a shows an example of adaptive constellation mapping in downlink at the IRU whereas FIG. 15b shows the same example for de-mapping in the radio dot, the data mapped by the IRU in FIG. 15a. The rules are determined by a bit-vector that contains the supported number of bits per subcarrier on the fronthaul for the considered frequency band (i.e., the downlink/uplink band). Thus there is one bit-vector $B_{DL}(k)$ for downlink and one bit-vector $B_{UL}(k)$ for uplink. In FIG. 15a, the bit vector determines that the first two bits, c(1) and c(2), will define one 4QAM-symbol to be allocated subcarrier index 1, i.e. one tone, and that bits c(3)-c(6) defines a 16QAM-symbol that is to be allocated subcarrier index 2, i.e. another tone. Even though the uplink and downlink may in general have different number of subcarriers, we simplify the notation by assuming K subcarriers in both bands. Further down in the document, a method for obtaining $B_{DL}(k)$ and $B_{UL}(k)$ is disclosed. It should be noted that the number of LTE subcarriers are not necessarily the same as the number of subcarriers on the fronthaul channel.

The herein considered fronthaul FDD or echo-cancelled, i.e. overlapped DL and UL frequency bands, system comprises a wired media, e.g. a twisted-pair cable, and a multi-carrier transmitter and receiver arranged at both sides of the cable, i.e. both at the IRU/DU and the radio dot, utilizing conventional discrete multi-tone, DMT, modulation/demodulation techniques. Recall that DMT is similar to OFDM but more suited for wired media that allows conveying a real-valued low-pass signal, i.e. not a bandpass signal. More specifically, the main parts of the fronthaul transmitter, see FIG. 14a, comprises an encoder, e.g. FEC, constellation mapper, and IFFT, while the fronthaul receiver, see FIG. 14b, comprises the corresponding functions, i.e., FFT, frequency domain equalization (FEQ), constellation de-mapper, and decoder (FEC). Since the channel impulse response of considered CAT5 or 6 twisted-pair cables are shorter than the used cyclic prefix, CP, FEQ is sufficient. In downlink, see e.g. FIG. 11, the LTE information bits are the input to the fronthaul transmitter and are sent via the fronthaul channel to the fronthaul receiver residing in Radio Dot. The fronthaul receiver demodulates and de-maps the bits and sends the FEC-decoded LTE information bits to the LTE encoder and modulator prior to RF conversion for transmission on to the antenna(s).

Figure 16A:
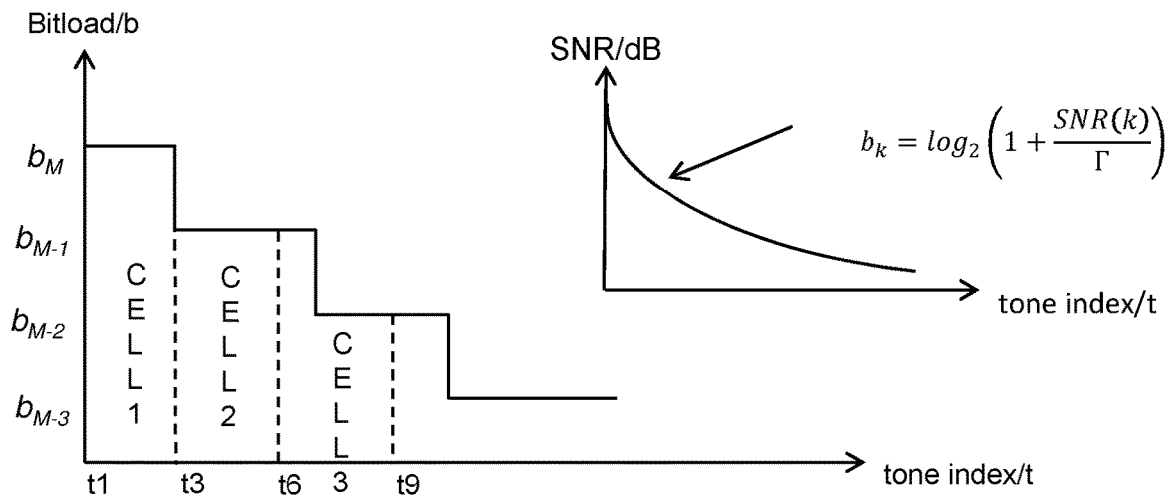
FIGS. 16a and 16b are x-y diagrams illustrating prior art cell scenarios.
Figure 16B:
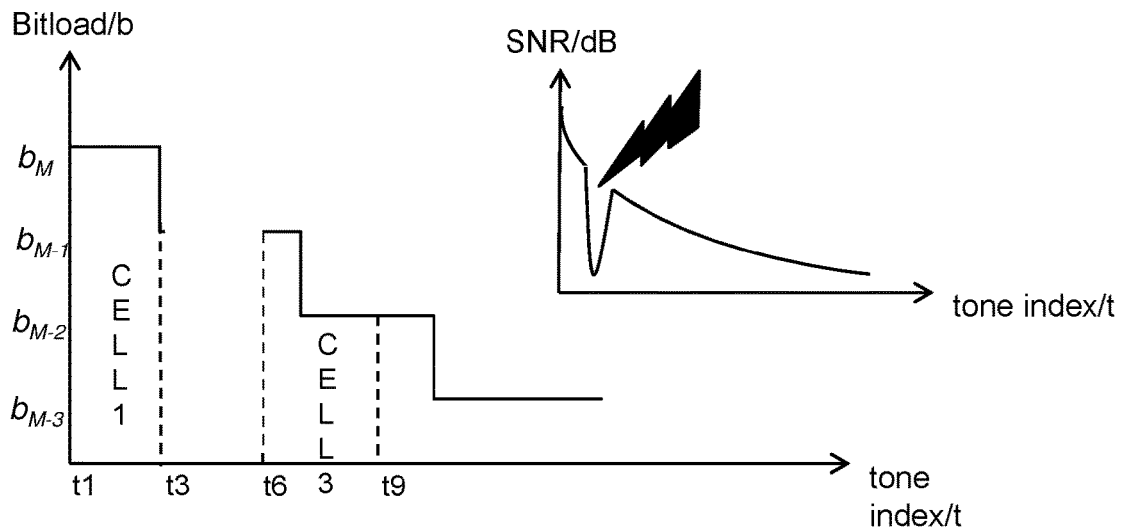
Figure 17A:
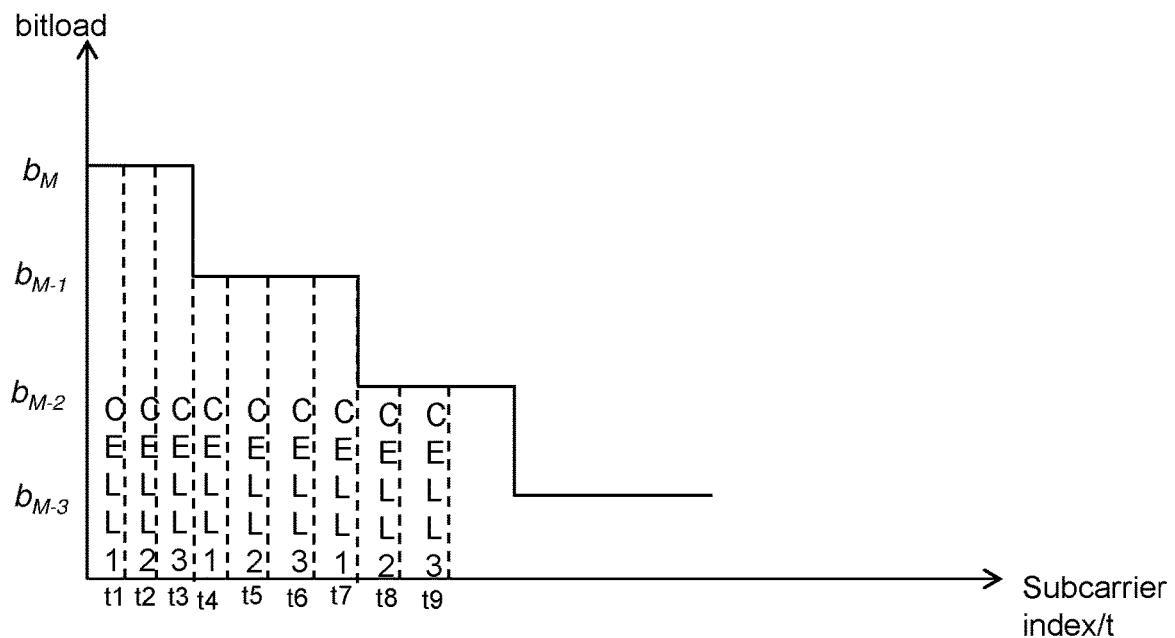
FIGS. 17a and 17b are x-y diagrams illustrating cell scenarios according to possible embodiments.
Figure 17B:
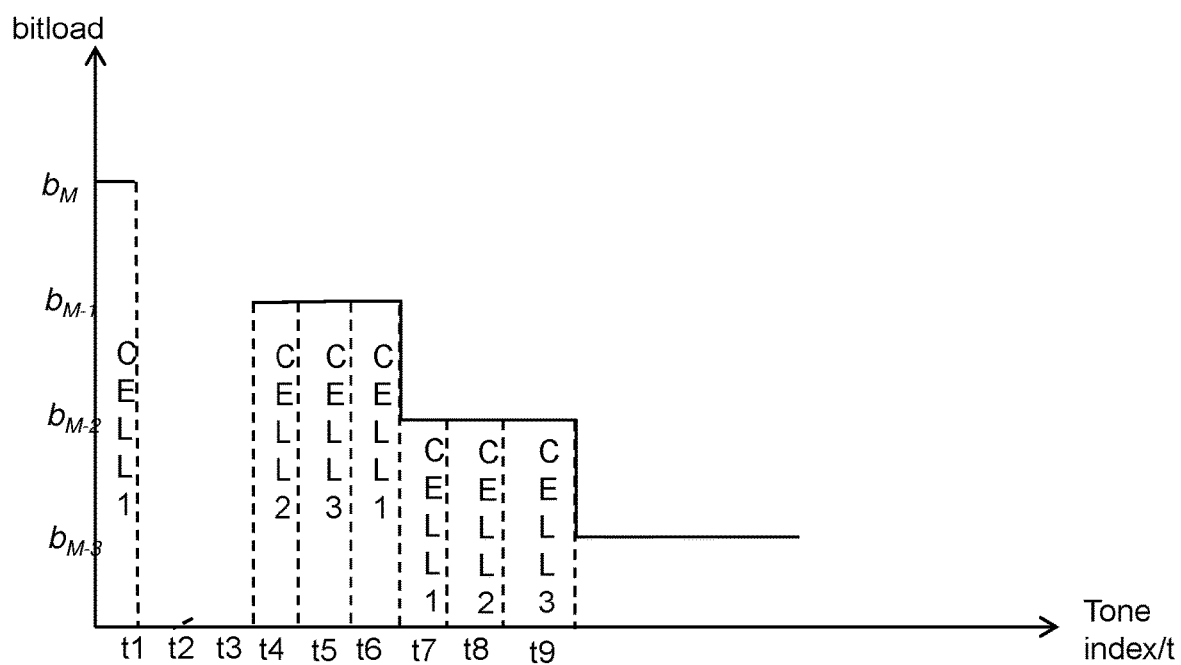

In the following, an embodiment for interlacing cell-streamed data on a fronthaul system with adaptive degree of reliability and capacity is described. For considered scenarios, and as described in FIG. 13, excessive capacity on the fronthaul can be exploited to support multiple cells on the same fronthaul instead of prior art FDD-based systems utilizing an echo cancelled fronthaul system with shared uplink and downlink bands together with increased modulation size for the fronthaul subcarriers. FIG. 16a shows a scenario where each cell is allocated a specific frequency band of the fronthaul. In FIG. 16a, $b_M$ denotes the bitload where M is maximum number of bits supported. Bit load may be higher on lower frequencies (tone index) as the SNR is higher for lower frequencies. However, when the cells are allocated one frequency band each, it may be the case that due to SNR reduction due to for example a noise event in the fronthaul cable, one cell looses almost all its capacity. Such a scenario is illustrated in FIG. 16b, wherein cell 2 due to a noise event in the fronthaul cable reducing SNR at the transmission frequency of cell 2 cannot maintain its service. According to an embodiment of the present invention, the data streams from the multiple cells can be interlaced among the fronthaul subcarriers to spread out the data evenly and fairly on good/bad subcarriers within the transmission band. Hereby, a situation as in FIG. 16b can be avoided. Further, interlacing cells served by one DU/IRU in frequency domain makes it easy to administer the different cells also when cells would belong to different operators. Each cell and operator would be allocated specific, in frequency domain, fronthaul band plans that should have the ability to be adapted to changing line conditions. An example of an interlacing of different cells to fronthaul subcarriers is illustrated in FIG. 17a. As seen in FIG. 117a, the cells are interlaced so that cell 1 is allocated subcarrier index t1, t4, t7, whereas cell 2 is allocated subcarrier index t2, t5, t8 and cell 3 is allocated subcarrier index t3, t6, t9. FIG. 17b shows how the embodiment of interlaced cell allocation makes it possible to continue operate the three cells of FIG. 17a even if some parts (t2, t3) of the frequency spectrum of the fronthaul is notched out. As another example of interlacing, the multiple cell data-streams from cell 1 and 2 (c1, and c2), for simplicity only two cells considered here, are interlaced as {c1(1), c2(1), c1(2), c2(2), c1(3), c2(3), . . . } prior to joint encoding (FEC) and modulation at the fronthaul transmitter. The inverse operation takes place in the fronthaul receiver.

In another interlacing embodiment, the multiple cell data-streams from cell 1 and 2 (c1, and c2) are first individually encoded, e.g. by adjusting code rate R in the FEC, to allow for cell-specific FEC strengths. The latter is in particular important for a cell supporting e.g. critical Machine Type Communication, MTC, where the end-to-end block error rate, BLER, may be 6 order of magnitude more stringent that for normal data, e.g. supporting BLER of $10^{-9}$ instead of $10^{-3}$. At the same time, there is no need to support such high reliability on the fronthaul unless it is needed on the air interface. In another embodiment, multiple fronthaul FECs are applied within a cell stream (c1 or c2) to support various reliability requirements within a cell. For the latter two cases, the two encoded streams are further interlaced prior to modulation. In yet another embodiment, the said two encoded streams are defined as real/imaginary part of the subcarrier specific QAM modulation according to a bit-load vector.

Figure 18:
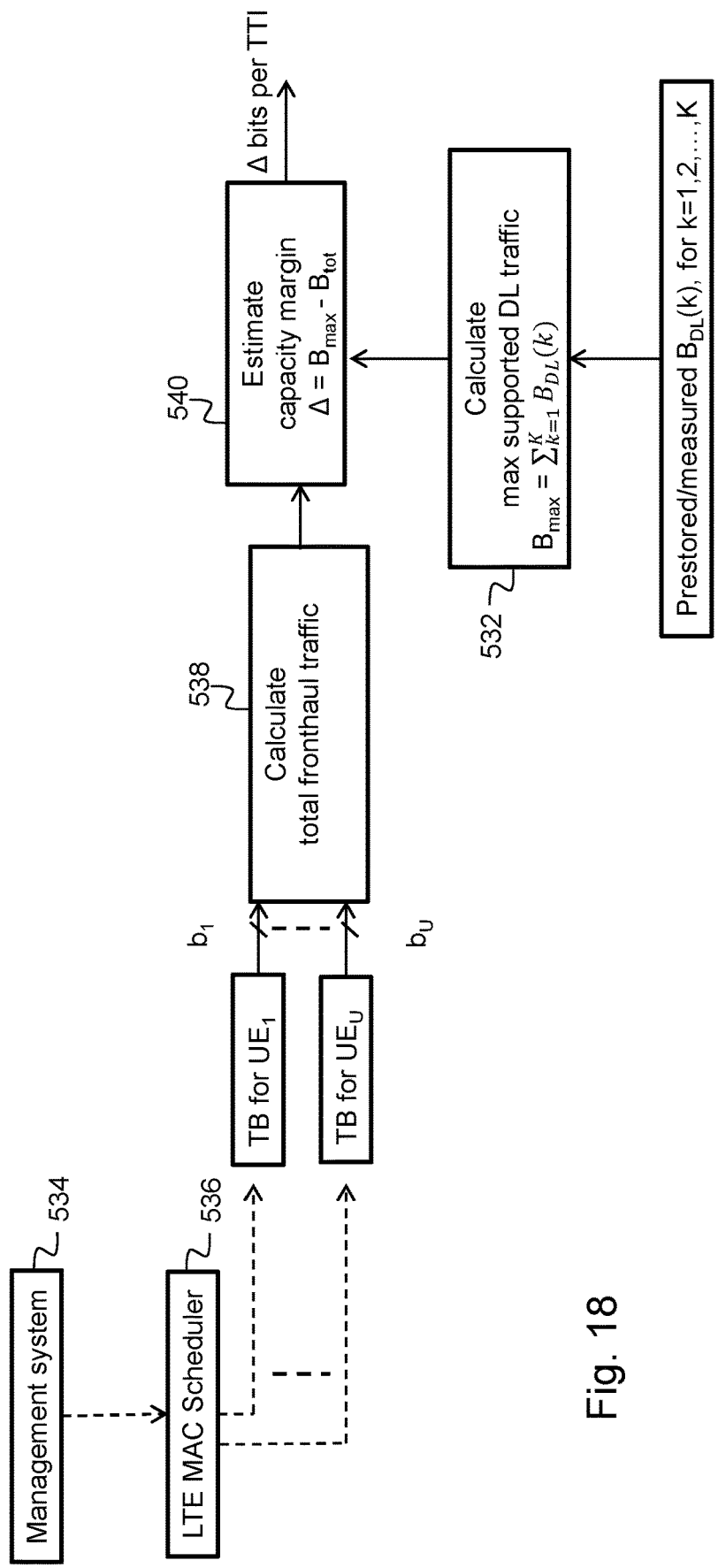
FIG. 18 is a schematic block diagram of a possible process for estimating capacity margin.

According to another embodiment, as shown in FIG. 18, a capacity margin of the fronthaul channel is estimated. In this embodiment, it is checked checked/verified that the fronthaul capacity can support the LTE scheduled traffic by means of calculating the fronthaul capacity margin. This margin, e.g. a scalar value, can be used to inform e.g. the operator of the LTE capacity extension potential supported by the fronthaul.

According to the embodiment, as a first step, maximum number of bits that can be sent per subcarrier on the fronthaul is estimated. The estimated number of bits per subcarrier is further called a bit vector, one estimation for downlink $B_{DL}(k)$ and one estimation for uplink $B_{UL}(k)$ may be made, where k is the subcarrier numbered k=1, 2 . . . , K. The bit vectors may be obtained according to embodiment described further down in this document, although already pre-stored values could be used if the fronthaul channel has not changed significantly since last time the values where obtained. Hence the maximum supported capacity, i.e. number of bits per TTI on the downlink fronthaul channel is calculated 532 as $B_{max}=\Sigma_{k=1}^{K} B_{DL}(k)$ and in an analog way for the uplink.

Secondly, the LTE Scheduler 536 is informed by e.g. a management system 534 of the operator of the LTE scheduler to issue a maximum traffic allocation, i.e. largest transport block, TB, with the maximum simultaneously connected UEs via control commands or by connecting physical/test UE(s) in such way that the scheduler issues maximum traffic load. Thirdly, the total fronthaul traffic is calculated 538 as $B_{tot}=(1/R)\Sigma_{u=1}^{U} b_u$, where R is the FEC code rate used by the fronthaul transmitter/receiver. Fourthly, the downlink, and corresponding for uplink, capacity margin is estimated 540 as $\Delta=B_{max}-B_{tot}$, and the resulting capacity margin may be sent and presented in the operator's management system for further analysis/planning of the network. The calculating 538, estimating 540 and calculating 532 may be performed by a processor arranged in the DU/RRU.

According to an embodiment, the considered fronthaul system may have functions for obtaining, e.g. measuring, information of the supported number of bits per subcarrier on the downlink/uplink fronthaul channel, at a receiver side of the channel, i.e. for obtaining the bit vector $B_{DL}$ or $B_{UL}$. The obtained information ($B_{DL}(k)$ or $B_{UL}(k)$) is stored on the receiver side, i.e. at the remote node in downlink, and sent to the transmitter side, i.e. DU/IRU in DL, via an in-band control channel during the data transmission or using the full channel bandwidth during a special test phase issued by the management system. The latter is typically preferred during installation, maintenance, or when there is no data on the fronthaul. In the following, two methods to obtain the sought bit-vectors are described in terms of two embodiments.

According to a first embodiment, the fronthaul transmitter (in the DU/RRU in DL) transmits pilot signals, which may be known, that the receiver (in the remote node in DL) uses to measure the receiver SINR per subcarrier. If the considered fronthaul uses FDD, it may be important that the reverse direction simultaneously transmits random data while the pilot signals are being transmitted in the other band in order to capture the spectral leakage from one transmission band into the other. The receiver SINR values can be translated to a vector with the maximum supported number of bits per subcarrier on the fronthaul channel, typically presuming some fixed noise margin, e.g. 6 dB. The said bit-vector is represented by $B_{DL}(k)$ for the downlink band at subcarrier k=1, 2, . . . , K. Similarly, $B_{UL}(k)$ represents the uplink band. As before, K is the total number of subcarriers for the considered frequency band.

According to a second embodiment, a channel quality indicator, CQI, request may be issued with maximum resolution in frequency to a UE connected close to the Radio Dot, i.e., a UE with low path loss. The CQI request may be issued by the operator via the management system. In practice, the operator may simply put one or more UE(s) close to the Radio Dot antenna. Alternatively, the Radio Dot can have built-in functionality that mimics a UE that receives the CQI request and responds to the CQI request. In either case, the so obtained CQI values can be translated, approximately, to $B_{DL}(k)$. As mentioned before, it is assumed that the receiver side of the fronthaul system also performs this translation and stores $B_{DL}(k)$ (for the downlink case) as this information is needed in the corresponding de-mapper. A similar procedure is performed for the uplink. It is also assumed that the transmitter in the other band transmits random data during the CQI measurement in order to capture realistic noise environment. Today, the supported CQI measurements are tailored for radio communication rather than for fronthaul measurements wherefore the resolution in frequency and the reported MCS range are not ideal for the fronthaul case. However, with a minor extension of the 3GPP standard to also support reporting SINR measurements with subcarrier resolution or block of subcarriers, or $B_{DL}(k)$, this could become more accurate for the fronthaul system.

In case the DI/UL capacity margin estimated according to an embodiment described above is larger than zero, the capacity margin can, according to an embodiment, be traded for mitigation of leakage between UL and DL frequency bands on the considered FDD fronthaul system. Alternatively, the in the following described embodiment could be used to support cheaper Radio Dot hardware with less stringent requirements on the FDD filters.

Figure 19:
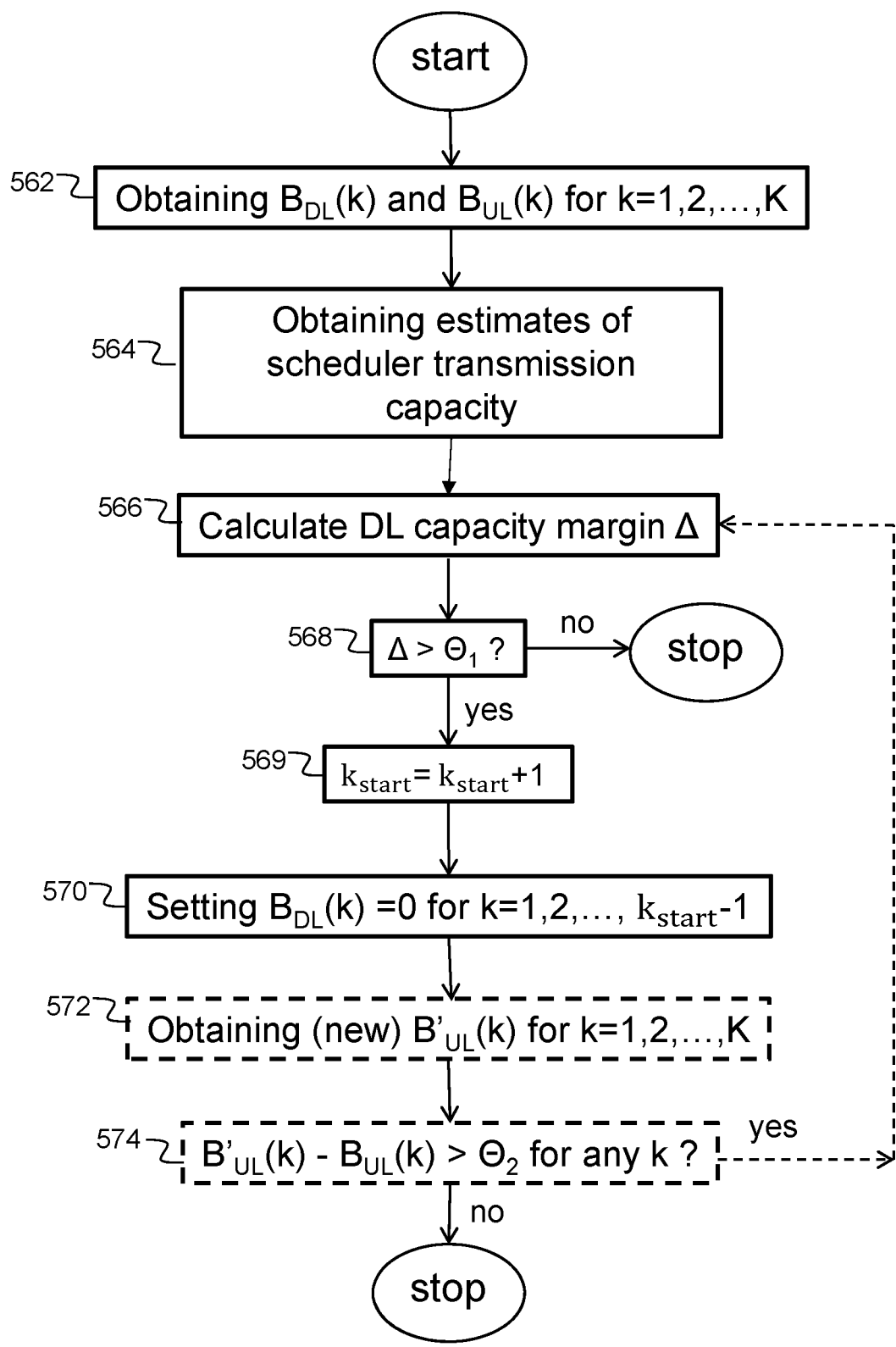
FIG. 19 is a flow chart illustrating possible embodiments.

To simplify the following description, we consider reducing the leakage from the DL to the UL band with method/scheme in details shown in a flow chart of FIG. 19. A similar method can be used for reducing leakage from the UL to the DL band, and follows straightforwardly.

In FIG. 19, it is assumed that the UL band is located below the frequencies of the DL band and that that both bands contain K number of subcarriers each. The method of FIG. 19 starts by obtaining 562 the bit vectors $B_{DL}(k)$ and $B_{UL}(k)$, for k=1, 2, . . . , K, i.e. obtaining the transmission capacity per sub-carrier of the fronthaul and adding the individual transmission capacity to a total fronthaul transmission capacity. Thereafter, estimates of maximum DU/IRU scheduler transmission capacity is obtained 564, and the downlink capacity margin is calculated 566 based on the difference between total fronthaul transmission capacity and scheduler transmission capacity. If there is a capacity margin 568 prominent subcarriers contributing to the leakage in the DL band are disabled by setting 570 $B_{DL}(k)=0$ for k=1, 2, . . . , $k_{start}-1$. Here, ($k_{start}-1$) is the last subcarrier index in the lower part of the DL band that significantly contributes to the UL received leakage interference. According to an embodiment, marked with a broken line in FIG. 19, the method may start by setting e.g. $k_{start}=1$ or 2 and then repeat the obtaining 572 of $B_{UL}(k)$ to get an updated (new) $B'_{UL}(k)$. If now the difference between $B'_{UL}(k)$ and $B_{UL}(k)$ differ 574 more than some threshold, the procedure iterates by from calculating the DL capacity margin by incrementing $k_{start}$ by 1, 569. When no significant improvement in $B'_{UL}(k)$ is observed, the procedure stops and we have found a $k_{start}$ index for the downlink band that minimizes the spectral leakage at the expense of reducing the downlink capacity margin, i.e., the downlink bandwidth. In the example illustrated in FIG. 19, k signifies sub-carrier index, a total of K sub-carriers are assumed in both DL and UL, $\theta_1$ and $\theta_2$ are design parameters, i.e. thresholds. In an embodiment, the capacity margin has to be higher than a capacity margin threshold $\theta_1$ for the method to proceed from the 568. In another embodiment, only if the bit vector has improved more than a second threshold $\theta_2$, the method may be iterated.

By at least some of the above methods, it is possible to geographically split the LTE functionality between the remote unit and the base unit so that the LTE PHY layer is implemented in the remote unit and the MAC layers and possible higher layers are implemented in the base unit. This enables a digital base station system solution, e.g. RDS that is relatively cost-efficient while at the same time supports multi-operator sharing of the remote units. At least some of the above embodiment provides a better utilization of the capacity of the fronthaul medium. Further, excessive capacity on the fronthaul can be exploited thanks to some embodiments, to thereby be able to support and deploy more cells. Further, some embodiments provide a fronthaul solution that simultaneously supports a wide range of reliability requirements on the air interface. Further, some embodiments enable efficient modulation/demodulation that provides a bit loading that enables trading excess capacity on the fronthaul for spectral leakage mitigation. Further, a seamless solution is provided by some embodiment that allows transport of LTE signals without changing the radio access standard, e.g. 3GPP LTE. Further, some embodiments provide a solution that exploits the 3GPP LTE standard during the installation/maintenance phase that provides real-time field measurements in support of the proposed solution.

Figure 20:
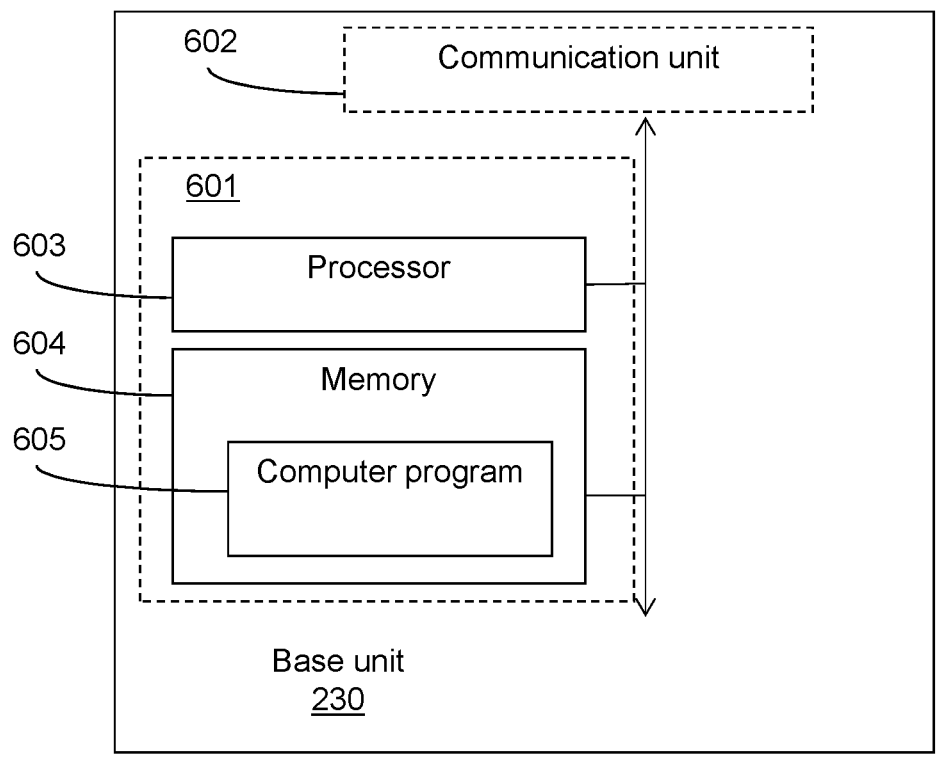
FIGS. 20-21 are schematic block diagrams of a base unit according to possible embodiments.

FIG. 20, in conjunction with FIG. 4, shows a base unit 230 operable in a base station system 200 of a wireless communication network, the base station system further comprising a remote unit 220 connected via a wired transmission line 225 to the base unit 230, the remote unit being arranged for transmitting signals received from the base unit wirelessly to wireless communication devices 240. The base unit 230 comprises a processor 603 and a memory 604. The memory contains instructions executable by said processor, whereby the base unit 230 is operative for modulating received Media Access Control, MAC, data packets onto a plurality of sub-frequency bands of a frequency band of the transmission line, and transmitting, to the remote unit, the modulated MAC data packets over the transmission line.

According to an embodiment, a first group of the MAC data packets belong to a first data stream and a second group of the MAC data packets belong to a second data stream. Further, the base unit is operative for transmitting the MAC data packets of the first data stream and the MAC data packets of the second data stream to the remote unit time interlaced and/or frequency interlaced over the transmission line.

According to another embodiment, the base unit is further operative for obtaining estimates of maximum transmission capacity of the sub-bands of the transmission line, allocating data bits of the MAC data packets to the plurality of sub-bands based on the obtained estimates of maximum transmission capacity of the sub-bands, and transmitting the data bits of the MAC data packets in the plurality of sub-bands in accordance with the allocation.

According to another embodiment, the base unit is operative for obtaining the estimates of maximum transmission capacity of the sub-bands from information received from the remote unit.

According to another embodiment, the base unit is further operative for obtaining estimates of maximum transmission capacity of the sub-bands over the transmission line, obtaining estimates of maximum scheduler transmission capacity, the scheduler transmission capacity corresponding to number of bits possible to transmit from a scheduler of the base unit over the transmission line, and estimating a difference between the obtained maximum transmission capacity and the maximum scheduler transmission capacity.

According to another embodiment, a first group of the MAC data packets belong to a first data stream having a first error rate requirement and a second group of the MAC data packets belong to a second data stream having a second error rate requirement different from the first error rate requirement. The base unit is further operative for allocating data bits of the MAC data packets to the plurality of sub-bands based on the first and second error rate requirement, and for transmitting data bits of the MAC data packets in the plurality of sub-bands in accordance with the allocation.

According to other embodiments, the base unit 230 may further comprise a communication unit 602, which may be considered to comprise conventional means for communicating from and/or to the remote unit over the wired transmission line, as well as from/to other nodes in the wireless network 100 outside the base station system, The instructions executable by said processor 603 may be arranged as a computer program 605 stored e.g. in said memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the actions and/or methods mentioned above.

The computer program 605 may comprise computer readable code means, which when run in the base unit 230 causes the base unit to perform the steps described in any of the described embodiments of the base unit. The computer program 605 may be carried by a computer program product connectable to the processor 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the base unit has access via the communication unit 602. The computer program may then be downloaded from the server into the memory 604.

Figure 21:
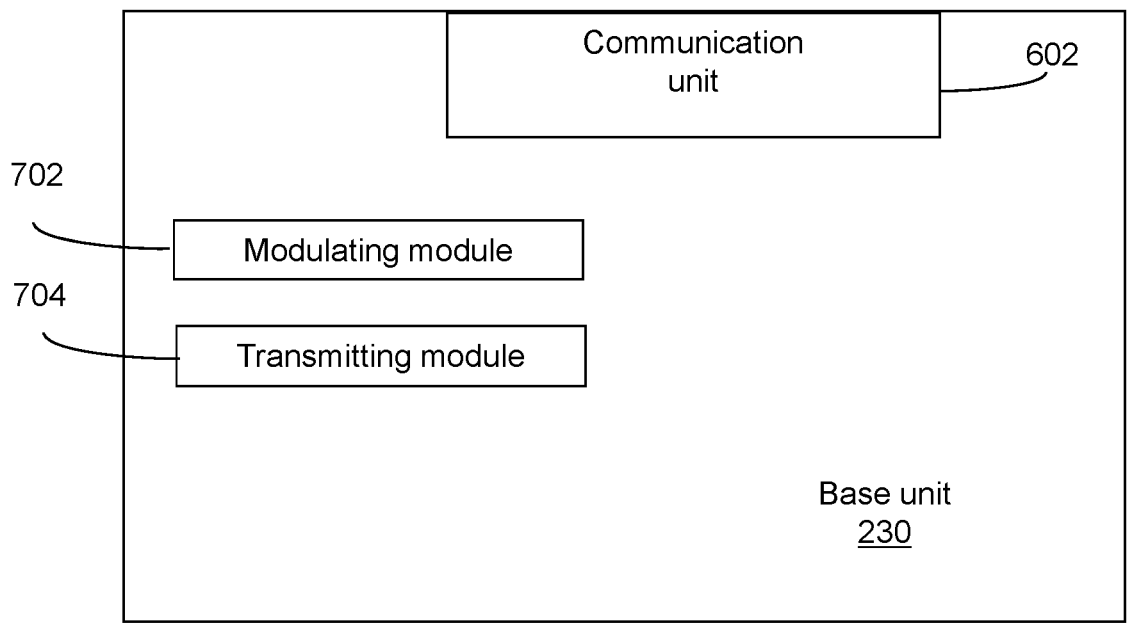

FIG. 21, in conjunction with FIG. 4, describes an embodiment of a base unit 230 operable in a base station system 200 of a wireless communication network, the base station system further comprising a remote unit 220 connected via a wired transmission line 225 to the base unit 230, the remote unit 220 being arranged for transmitting signals received from the base unit wirelessly to wireless communication devices 240. The base unit 230 comprises a modulating module 702 for modulating received Media Access Control, MAC, data packets onto a plurality of sub-frequency bands of a frequency band of the transmission line, and a transmitting module 704 for transmitting, to the remote unit, the modulated MAC data packets over the transmission line. The base unit 230 may further comprise a communication unit 602 similar to the communication unit of FIG. 20.

Figure 22:
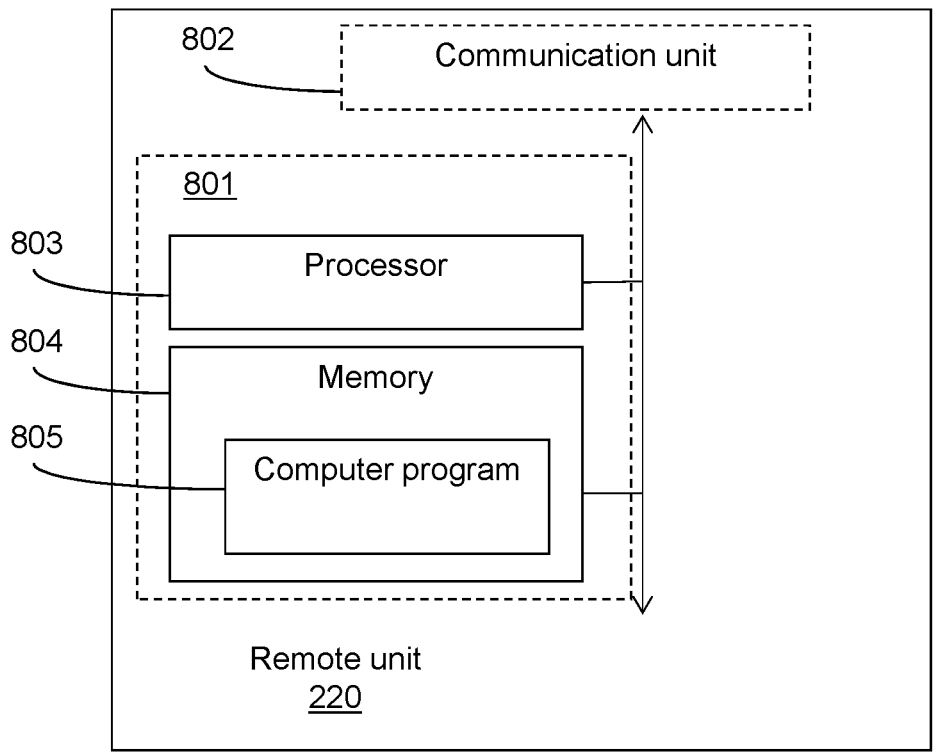
FIGS. 22-23 are schematic block diagrams of a remote unit according to possible embodiments.

FIG. 22, in conjunction with FIG. 4, describes a remote unit 220 operable in a base station system 200 of a wireless communication network, the base station system further comprising a base unit 220 connected via a wired transmission line to the remote unit 230. The remote unit 220 is arranged for transmitting signals wirelessly to wireless communication devices 240. The remote unit 220 comprises a processor 803 and a memory 804. The memory contains instructions executable by said processor, whereby the remote unit 220 is operative for receiving modulated Media Access Control, MAC, data packets over the transmission line from the base unit, the MAC data packets being modulated onto a plurality of sub-frequency bands of a frequency band of the transmission line, demodulating the received MAC data packets, and transmitting wirelessly to a wireless device 240 the demodulated MAC data packets as radio frequency signals.

According to an embodiment, a first group of the MAC data packets belong to a first data stream and a second group of the MAC data packets belong to a second data stream. Further, the remote unit is operative for receiving the MAC data packets of the first data stream and the MAC data packets of the second data stream time interlaced and/or frequency interlaced over the transmission line.

According to another embodiment, the remote unit is operative for receiving data bits of the MAC data packets allocated to the plurality of sub-bands depending on maximum transmission capacity of individual of the sub-bands of the transmission line. Further, the remote unit is aware of the allocation of the data bits of the MAC data packets to the plurality of sub-bands when receiving the MAC data packets.

According to another embodiment, the remote unit is further operative for obtaining the maximum transmission capacity of the individual of the sub-bands, and sending information on the measured maximum transmission capacity on the individual sub-bands to the base unit.

According to another embodiment, a first group of the MAC data packets belong to a first data stream having a first error rate requirement and a second group of the MAC data packets belong to a second data stream having a second error rate requirement different from the first error rate requirement. The remote unit is operative for allocating data bits of the received MAC data packets to the plurality of sub-bands based on the first and second error rate requirement, and for receiving the data bits of the MAC data packets in the plurality of sub-bands in accordance with the allocation.

According to another embodiment, the received modulated MAC data packets are multi-carrier modulated MAC data packets, such as DMT modulated MAC data packets.

According to other embodiments, the remote unit 220 may further comprise a communication unit 802, which may be considered to comprise conventional means for communicating wirelessly from and to UEs and for communicating via wireline to the base unit. The communication unit 802 may comprise transmitting units for transmitting wireless signals and receiving units for receiving wireless signals. The instructions executable by said processor 803 may be arranged as a computer program 805 stored e.g. in said memory 804. The processor 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the actions and/or methods mentioned above.

Figure 23:
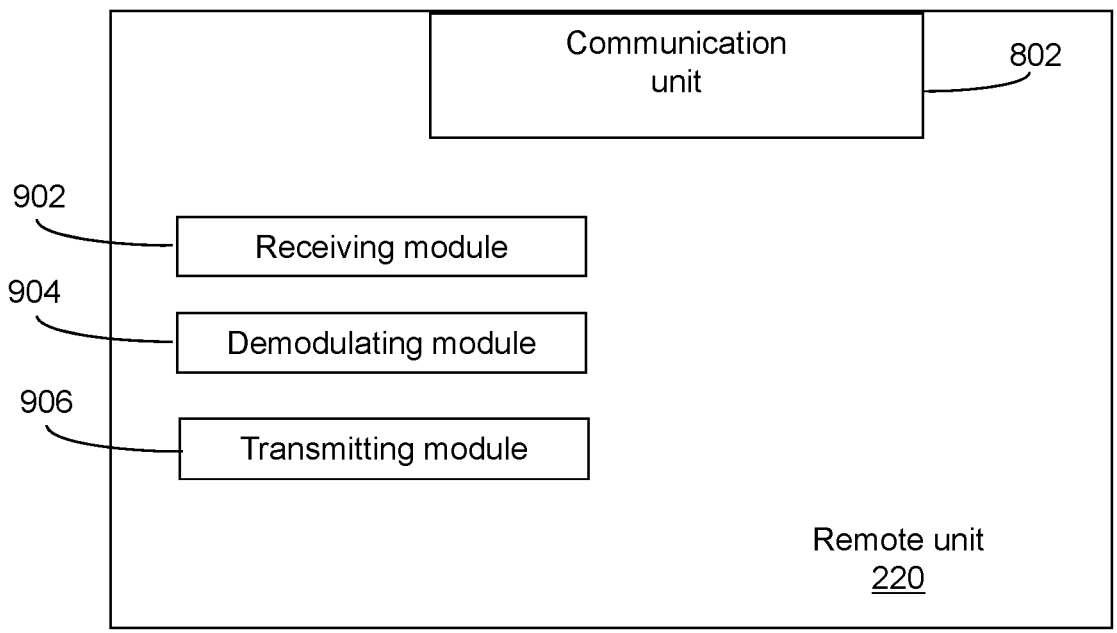

FIG. 23, in conjunction with FIG. 4, describes a remote unit 220 operable in a base station system 200 of a wireless communication network, the base station system further comprising a base unit 220 connected via a wired transmission line to the remote unit 230, the remote unit 220 being arranged for transmitting signals wirelessly to wireless communication devices 240. The remote unit 220 comprises a receiving module 902 for receiving modulated MAC data packets over the transmission line from the base unit, the MAC data packets being modulated onto a plurality of sub-frequency bands of a frequency band of the transmission line, a demodulating module 904 for demodulating the received MAC data packets, and a transmitting module 906 for transmitting wirelessly to a wireless device 240, the demodulated MAC data packets as radio frequency signals. The remote unit 220 may also comprise a communication unit 802 similar to the communication unit 802 of FIG. 22.

The computer programs 805 may comprise computer readable code means, which when run in the remote unit 220 causes the remote unit to perform the steps described in any of the described embodiments of the remote unit. The computer program 805 may be carried by a computer program product connectable to the processor 803. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the remote unit has access via the communication unit 802. The computer program may then be downloaded from the server into the memory 804.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a base unit, of a base station system of a wireless communication network, the base station system further comprising a remote unit connected via a wired transmission line to the base unit, the remote unit being arranged for transmitting signals wirelessly to a wireless communication device, the method comprising:
   modulating received Media Access Control, MAC, data packets onto a plurality of sub-frequency bands of a frequency band of the transmission line, wherein a first group of the MAC data packets belong to a first data stream having a first error rate requirement and a second group of the MAC data packets belong to a second data stream having a second error rate requirement different from the first error rate requirement, further comprising allocating data bits of the MAC data packets to the plurality of sub-bands based on the first and second error rate requirement, and wherein data bits of the MAC data packets are transmitted in the plurality of sub-bands in accordance with the allocation; and
   transmitting, to the remote unit, the modulated MAC data packets over the transmission line.

2. Method according to claim 1, wherein a first group of the MAC data packets belong to a first data stream and a second group of the MAC data packets belong to a second data stream, and wherein the MAC data packets of the first data stream and the MAC data packets of the second data stream are transmitted to the remote unit time interlaced and/or frequency interlaced over the transmission line.

3. Method according to claim 1, further comprising:
   obtaining estimates of maximum transmission capacity of the sub-bands of the transmission line, and
   allocating data bits of the MAC data packets to the plurality of sub-bands based on the obtained estimates of maximum transmission capacity of the sub-bands,
   and wherein the data bits of the MAC data packets are transmitted in the plurality of sub-bands in accordance with the allocation.

4. Method according to claim 3, wherein the estimates of maximum transmission capacity of the sub-bands are obtained from information received from the remote unit.

5. Method according to claim 4, further comprising:
   transmitting, to the remote unit, a signal on the sub-bands, and wherein the information received from the remote unit comprises information of signal to noise ratio measured on the transmitted signal.

6. Method according to claim 4, further comprising:
   transmitting a Channel Quality Indicator, CQI, request to the remote unit, and wherein the information received from the remote unit of estimates of maximum transmission capacity originates from a translation of CQI values of the CQI request.

7. Method according to claim 1, further comprising:
   obtaining estimates of maximum transmission capacity of the sub-bands over the transmission line;
   obtaining estimates of maximum scheduler transmission capacity, the scheduler transmission capacity corresponding to number of bits possible to transmit from a scheduler of the base unit over the transmission line;
   estimating a difference between the obtained maximum transmission capacity and the maximum scheduler transmission capacity.

8. Method according to claim 7, wherein, based on the estimated difference between maximum transmission capacity and maximum number of bits from a scheduler, the modulated MAC data packets are transmitted to the remote unit over the transmission line at the plurality of sub-frequency bands except for the outermost sub-frequency bands.

9. Method according to claim 1, wherein the modulation of received MAC data packets comprising multi-carrier modulation of the MAC data packets, such as Discrete Multi-tone, DMT, modulation.

10. Method according to claim 1, further comprising coding the MAC data packets, and wherein the transmitting comprises transmitting the modulated and coded MAC data packets.

11. A method performed by a remote unit of a base station system of a wireless communication network, the base station system further comprising a base unit connected via a wired transmission line to the remote unit, the remote unit being arranged for transmitting signals wirelessly to wireless communication devices, the method comprising:
   receiving modulated Media Access Control, MAC, data packets over the transmission line from the base unit, the MAC data packets being modulated onto a plurality of sub-frequency bands of a frequency band of the transmission line, wherein a first group of the MAC data packets belong to a first data stream having a first error rate requirement and a second group of the MAC data packets belong to a second data stream having a second error rate requirement different from the first error rate requirement, wherein data bits of the received MAC data packets are allocated to the plurality of sub-bands based on the first and second error rate requirement, and wherein data bits of the MAC data packets are received in the plurality of sub-bands in accordance with the allocation;
   demodulating the received MAC data packets, and
   transmitting wirelessly to a wireless device the demodulated MAC data packets as radio frequency signals.

12. Method according to claim 11, wherein the received modulated MAC data packets are also coded, and the method further comprises decoding the received MAC data packets.

13. Method according to claim 11, wherein a first group of the MAC data packets belong to a first data stream and a second group of the MAC data packets belong to a second data stream, and wherein the MAC data packets of the first data stream and the MAC data packets of the second data stream are received time interlaced and/or frequency interlaced over the transmission line.

14. Method according to claim 11, wherein data bits of the MAC data packets are received allocated to the plurality of sub-bands depending on maximum transmission capacity of individual of the sub-bands of the transmission line, and wherein the remote unit is aware of the allocation of the data bits of the MAC data packets to the plurality of sub-bands when receiving the MAC data packets.

15. Method according to claim 14, further comprising:
obtaining the maximum transmission capacity of the individual of the sub-bands;
sending information on the measured maximum transmission capacity on the individual sub-bands to the base unit.

16. Method according to claim 15, further comprising:
receiving a signal from the base unit, and wherein the obtaining of maximum transmission capacity comprises measuring SINR on the individual sub-bands on the received signal, and wherein the sending of information of maximum transmission capacity comprises sending information of the measured SINR on the individual sub-bands to the base unit.

17. Method according to claim 15, further comprising:
receiving a Channel Quality Indicator, CQI, request from the base unit, and wherein the obtaining of maximum transmission capacity comprises obtaining CQI values from the received CQI request, and translating the obtained CQI values to the information of maximum transmission capacity of the individual sub-bands.

18. Method according to claim 11, wherein the received modulated MAC data packets are multi-carrier modulated MAC data packets, such as DMT modulated MAC data packets.

19. A base unit operable in a base station system of a wireless communication network, the base station system further comprising a remote unit connected via a wired transmission line to the base unit the remote unit being arranged for transmitting signals received from the base unit wirelessly to wireless communication devices the base unit comprising a processor and a memory, said memory containing instructions executable by said processor, whereby the base unit is operative for:
modulating received Media Access Control, MAC, data packets onto a plurality of sub-frequency bands of a frequency band of the transmission line, wherein a first group of the MAC data packets belong to a first data stream having a first error rate requirement and a second group of the MAC data packets belong to a second data stream having a second error rate requirement different from the first error rate requirement, the base unit further being operative for allocating data bits of the MAC data packets to the plurality of sub-bands based on the first and second error rate requirement, and for transmitting data bits of the MAC data packets in the plurality of sub-bands in accordance with the allocation; and
transmitting, to the remote unit, the modulated MAC data packets over the transmission line.

20. Base unit according to claim 19, wherein a first group of the MAC data packets belong to a first data stream and a second group of the MAC data packets belong to a second data stream, and wherein the base unit is operative for transmitting the MAC data packets of the first data stream and the MAC data packets of the second data stream to the remote unit time interlaced and/or frequency interlaced over the transmission line.

21. Base unit according to claim 19, further being operative for: obtaining estimates of maximum transmission capacity of the sub-bands of the transmission line, and allocating data bits of the MAC data packets to the plurality of sub-bands based on the obtained estimates of maximum transmission capacity of the sub-bands, and transmitting the data bits of the MAC data packets in the plurality of sub-bands in accordance with the allocation.

22. Base unit according to claim 21, being operative for obtaining the estimates of maximum transmission capacity of the sub-bands from information received from the remote unit.

23. Base unit according to claim 19, further being operative for:
obtaining estimates of maximum transmission capacity of the sub-bands over the transmission line;
obtaining estimates of maximum scheduler transmission capacity, the scheduler transmission capacity corresponding to number of bits possible to transmit from a scheduler of the base unit over the transmission line, and estimating a difference between the obtained maximum transmission capacity and the maximum scheduler transmission capacity.

24. A remote unit operable in a base station system of a wireless communication network, the base station system further comprising a base unit connected via a wired transmission line to the remote unit, the remote unit being arranged for transmitting signals wirelessly to wireless communication devices, the remote unit comprising a processor and a memory, said memory containing instructions executable by said processor, whereby the remote unit is operative for:
receiving modulated Media Access Control, MAC, data packets over the transmission line from the base unit, the MAC data packets being modulated onto a plurality of sub-frequency bands of a frequency band of the transmission line, wherein a first group of the MAC data packets belong to a first data stream having a first error rate requirement and a second group of the MAC data packets belong to a second data stream having a second error rate requirement different from the first error rate requirement, the remote unit being operative for allocating data bits of the received MAC data packets to the plurality of sub-bands based on the first and second error rate requirement, and for receiving the data bits of the MAC data packets in the plurality of sub-bands in accordance with the allocation;
demodulating the received MAC data packets, and
transmitting wirelessly to a wireless device the demodulated MAC data packets as radio frequency signals.

25. Remote unit according to claim 24, wherein a first group of the MAC data packets belong to a first data stream and a second group of the MAC data packets belong to a second data stream, the remote unit being operative for receiving the MAC data packets of the first data stream and the MAC data packets of the second data stream time interlaced and/or frequency interlaced over the transmission line.

26. Remote unit according to claim 24, operative for receiving data bits of the MAC data packets allocated to the plurality of sub-bands depending on maximum transmission capacity of individual of the sub-bands of the transmission line, and wherein the remote unit is aware of the allocation of the data bits of the MAC data packets to the plurality of sub-bands when receiving the MAC data packets.

27. Remote unit according to claim 26, further operative for:
obtaining the maximum transmission capacity of the individual of the sub-bands, and sending information on the measured maximum transmission capacity on the individual sub-bands to the base unit.

28. Remote unit according to claim 24, wherein the received modulated MAC data packets are multi-carrier modulated MAC data packets, such as DMT modulated MAC data packets.

* * * * *